US008213543B2

(12) United States Patent
Dubuc et al.

(10) Patent No.: US 8,213,543 B2
(45) Date of Patent: *Jul. 3, 2012

(54) SYSTEM AND METHOD FOR I/Q IMBALANCE COMPENSATION

(75) Inventors: Christian Dubuc, Aylmer (CA); Daniel Boudreau, Hull (CA); William R. Kirkland, Kanata (CA)

(73) Assignee: Rockstar Bidco, LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,757

(22) Filed: May 10, 2010

(65) Prior Publication Data

US 2010/0220825 A1     Sep. 2, 2010

Related U.S. Application Data

(60) Division of application No. 11/878,283, filed on Jul. 23, 2007, now Pat. No. 7,869,538, which is a continuation of application No. 10/321,699, filed on Dec. 18, 2002, now Pat. No. 7,251,291, which is a continuation-in-part of application No. 10/115,081, filed on Apr. 4, 2002, now Pat. No. 7,020,226.

(51) Int. Cl.
*H03K 9/00* (2006.01)
*H04L 27/00* (2006.01)

(52) U.S. Cl. ......... 375/316; 370/206; 370/491; 370/500

(58) Field of Classification Search .................. 375/285, 375/319, 346–348, 316; 370/206, 491, 500
See application file for complete search history.

(56) References Cited

U.S. PATENT DOCUMENTS

| 4,197,496 | A | 4/1980 | Hiyama |
| 5,949,821 | A | 9/1999 | Emani et al. |
| 6,219,391 | B1 * | 4/2001 | Nakano ........................ 375/346 |
| 6,330,290 | B1 | 12/2001 | Glas |
| 6,363,102 | B1 | 3/2002 | Ling et al. |

(Continued)

FOREIGN PATENT DOCUMENTS

EP         0540232         10/1992

OTHER PUBLICATIONS

Kirkland, W.R.; Teo, K.H.; I/Q Distortion Correction for an OFDM Direct Conversion Receiver, IEEE Electronic Letters, vol. 39, Issue I, pp. 131-133, Jan. 9, 2003.

(Continued)

*Primary Examiner* — Jean B Corrielus

(57) ABSTRACT

A transmitter (102) generates a first set of data symbols and a first pilot symbol (601) at a first time, and a second set of data symbols and a second pilot symbol (602) at a different, second time. The first (601) and second (602) pilot symbols are each represented by first (701) and second (702) pilot carriers, respectively, located at first (703) and second (704) predetermined sample frequencies, respectively, in a channel bandwidth. For the first pilot symbol (601), the first (701) and second (702) pilot carriers have first and second predetermined values, respectively. For the second pilot symbol (602), the first (701) and second (702) pilot carriers have third and fourth predetermined values, respectively. A receiver (104) measures the first, second, fourth and third predetermined values responsive to receiving the first (601) and second (602) pilot symbols to determine first, second, third and fourth estimates of channel distortion, respectively, for compensating and recovering the first and the second sets of data symbols.

16 Claims, 18 Drawing Sheets

U.S. PATENT DOCUMENTS

| | | | |
|---|---|---|---|
| 6,441,786 B1 * | 8/2002 | Jasper et al. | 342/383 |
| 6,519,300 B1 | 2/2003 | Ramesh | |
| 6,628,337 B1 * | 9/2003 | Yoshida | 348/372 |
| 6,647,074 B2 | 11/2003 | Citta et al. | |
| 6,826,240 B1 * | 11/2004 | Thomas et al. | 375/340 |
| 6,862,262 B1 * | 3/2005 | Imamura | 370/210 |
| 6,940,932 B2 * | 9/2005 | Henriksson | 375/347 |
| 7,020,226 B1 | 3/2006 | Kirkland | |
| 7,076,008 B2 | 7/2006 | Jeong | |
| 7,190,749 B2 * | 3/2007 | Levin et al. | 375/346 |
| 7,286,500 B1 * | 10/2007 | Bhatoolaul et al. | 370/320 |
| 7,664,009 B2 | 2/2010 | Wang et al. | |
| 2002/0045433 A1 | 4/2002 | Vihriala | |
| 2002/0101840 A1 | 8/2002 | Davidsson et al. | |
| 2003/0007574 A1 | 1/2003 | Li et al. | |
| 2003/0016773 A1 | 1/2003 | Atungsiri et al. | |
| 2003/0095589 A1 | 5/2003 | Jeong | |
| 2003/0123534 A1 | 7/2003 | Tsui et al. | |
| 2004/0203472 A1 | 10/2004 | Chien | |
| 2006/0182063 A1 | 8/2006 | Ma et al. | |

OTHER PUBLICATIONS

Khandani, A.K.; An efficient Addressing Scheme for Shaping of Multi-Dimensional Signal Constellations Using a Lookup Table; IEEE, pp. 354-357, 1994.

Kozintsev, Igor; Ramchandran, Kannan; "Robust Image Transmission Over Energy-Constrained Time-Varying Channels Using Multiresolution Joint Source-Channel Coding"; IEEE, pp. 1012-1026, 1998.

Schuchert, Andreas; Makowitz, Rainer; "Front End Architectures for Multistandard Digital TV Receivers"; IEEE Transactions on Consumer Electronics, 46(3):422-427, Aug. 2000.

Schuchert, Andreas; Hasholzner, Ralph; Buchholz; "Frequency Domain Equalization of IQ Imbalance in OFDM Receivers"; IEEE, pp. 28-29, 2001.

Robertson, Patrick; Wörz, Thomas; "Bandwidth-Efficient Turbo Trellis-Coded Modulation Using Punctured Compnent Codes"; IEEE Journal on Selected Areas in Communications, 16(2):206-218, Feb. 1998.

Khandani, Amir K.; Kabal, Peter; "Shaping Multidimensional Signal Spaces—Part I: Optimum Shaping, Shell Mapping"; IEEE Transactions on Information Theory, 39(6):1799-1808, Nov. 1993.

Khandani, Amir K.; Kabal, Peter; "Shaping Multidimensional Signal Spaces—Part II: Shell-Addressed Constellations"; IEEE Transactions on Information Theory, 39(6):1809-1819, Nov. 1993.

Le Goff, Stéphane; Glavieux, Alain; Berrou, Claude; "Turbo-Codes and High Spectral Efficiency Modulation"; IEEE, pp. 645-659, 1994.

Wachsmann, Udo; Fischer, Robert F. H.; Huber, Johannes B.; "Multilevel Codes: Theoretical Concepts and Practical Design Rules"; IEEE Transactions on Information Theory, 45(5):1361-1391, Jul. 1999.

Papke, L., Fazel, K.; "Combined Multilevel Turbo-Code with MR-Modulation"; IEEE, pp. 668-672, 1995.

Khandani, A.K.; Kabal, P.; "Shaping of Multi-Dimensional Signal Constellations Using A Lookup Table"; IEEE, pp. 927-931, 1992.

* cited by examiner

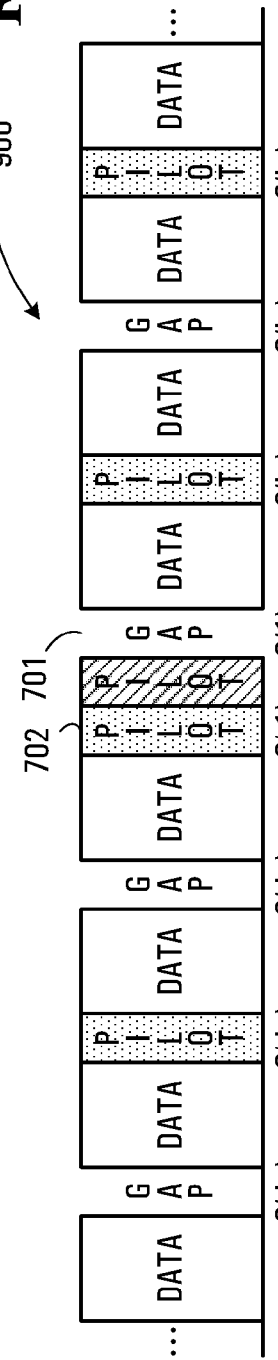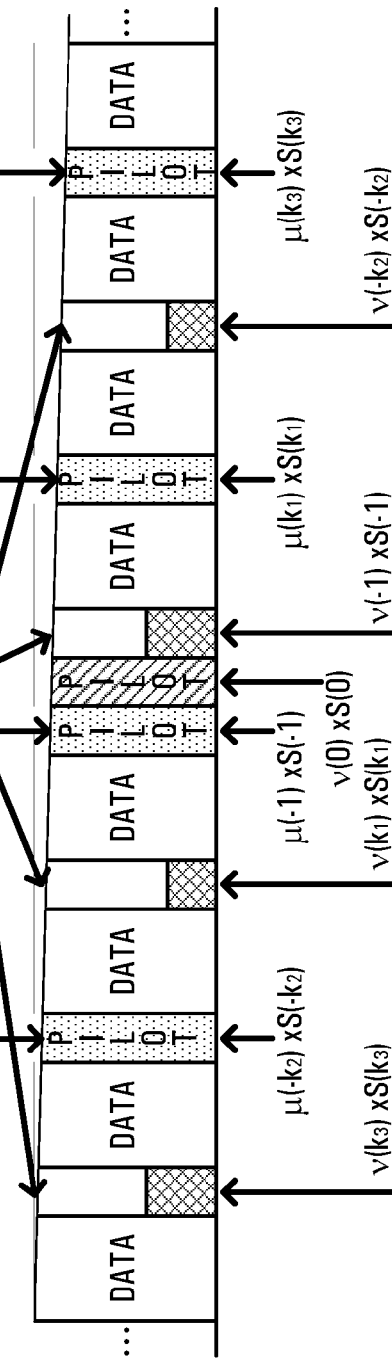

SYSTEM AND METHOD FOR I/Q IMBALANCE COMPENSATION

RELATED APPLICATIONS

This application is a divisional of U.S. application Ser. No. 11/878,283 filed on Jul. 23, 2007 which is a continuation of U.S. application Ser. No. 10/321,699 filed Dec. 18, 2002, which was a CIP of U.S. application Ser. No. 10/115,081 filed Apr. 4, 2002, now U.S. Pat. No. 7,020,226.

FIELD OF THE INVENTION

The present invention relates generally to communication systems, and more particularly to in-phase (I)/quadrature-phase (Q) imbalance compensation for the reception of signals such as orthogonal frequency division multiplex (OFDM) signals.

BACKGROUND OF THE INVENTION

A communication system, such as radiotelephone system, generally includes a transmitter communicating with a receiver over a communication channel. Characteristics of well-designed communication systems include being inexpensive, simple, small, easy to manufacture, and power efficient, while meeting performance specifications and customer expectations.

Communication systems may communicate signals using single or multiple carrier modulation, depending on the particular application. One type of multiple carrier modulation (MCM) is orthogonal frequency division multiplex (OFDM). OFDM is a modulation method that transmits a data stream in parallel using many orthogonal sub-carriers to transmit a signal. An inverse Fourier transform can be used to efficiently split the transmitted signal into the many sub-carriers, and a Fourier transform can be used to demodulate the received signal to recover the data stream. OFDM is more robust than the single carrier modulation because it protects the signal against inter-symbol interference, delay spread, frequency selective fading, and narrowband interference. Each sub-carrier is represented by complex in-phase (I) and quadrature-phase (Q) signals.

I/Q distortion of OFDM signals is caused by distortion on the communication channel, and in each of the modulator and the demodulator, by non-ideal quadrature conversion of the OFDM signals, by non-identical amplitude and phase responses in the I and Q branches, and non-linear phase characteristics in the low pass filters in each of the I and Q branches. The distortion on the communication channel is caused by factors such as inter-symbol interference, delay spread, frequency selective fading, narrowband interference, co-channel interference, and adjacent channel interference. Non-ideal quadrature conversion includes both non-ideal quadrature up-conversion in the quadrature modulator in the transmitter and/or non-ideal quadrature down-conversion in the quadrature demodulator in the receiver. The non-identical amplitude and phase responses in the I and Q paths in the modulator and the demodulator, and the non-linear phase characteristics in the low pass filters in each of the I and Q branches in the modulator and the demodulator may be caused by inaccuracies in analog components used in the modulator and the demodulator.

Traditionally, a receiver has a two-stage front-end circuit that receives an analog radio frequency (RF) signal. At the first stage, the front-end circuit converts the analog RF signal to an analog intermediate frequency (IF) signal having a lower frequency. At the second stage, the front-end circuit converts the analog IF signal to an analog baseband signal having the lowest frequency. The second stage is coupled to inexpensive analog to digital (AD) converters that convert the analog baseband signal to a digital baseband signal for subsequent digital baseband processing.

A direct conversion receiver, otherwise known as a direct down-converter or zero-intermediate frequency (IF) receiver, eliminates the IF conversion circuitry. In this case, the direct conversion receiver receives the analog RF signal, and then converts the analog RF signal directly to the analog baseband signal having the lowest frequency. Advantages of the direct conversion receiver include having fewer parts, which minimizes its cost, and having low current drain.

However, a problem with the direct conversion receiver is that the analog baseband signal is distorted by amplitude and phase imbalances in each of the I and Q branches in the demodulator and by the non-linear phase characteristics in the low pass filters in each of the I and Q branches in the demodulator. Spectral leakage is one type of I/Q distortion, wherein the positive frequency components of the base-band OFDM signal interfere with the negative frequency components of the base-band OFDM signal and vice versa. Attempts have been made to improve the performance of the direct conversion receiver by using components with tighter tolerances, by calibrating or tuning the components or circuitry in the factory before shipping the direct conversion receiver, by using phase equalizers to compensate the low pass filters, and by using frequency domain equalizers. However, components with tighter tolerances are more expensive. Factory calibration or tuning is time consuming. Phase equalizers increase cost, are not stable over time and temperature, and not satisfactory for high, more complex, levels of signal modulation. Frequency domain equalizers use adaptation algorithms that are slow to converge over the received signal. Analogous advantages and disadvantages also apply to an analog quadrature modulator for use in a direct conversion transmitter.

Accordingly, there is a need for I/Q distortion compensation for the reception of OFDM signals, and particularly for OFDM signals received by direct conversion receivers.

SUMMARY OF THE INVENTION

According to a first aspect of the invention, there is provided a method of transmitting comprising: generating a first transmit signal, including a first plurality of data symbols and a first pilot symbol, at a first transmit time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel; and generating a second transmit signal, including a second plurality of data symbols and a second pilot symbol, at a different, second transmit time, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel, In some embodiments, the method further comprises: selecting the first and third predetermined sample frequencies to be sufficiently close such that channel conditions are similar for both the first and third predetermined sample frequencies; and selecting the second and fourth predetermined sample frequencies to be sufficiently close such that channel conditions are similar for both the second and fourth predetermined sample frequencies.

In some embodiments, the method further comprises: selecting the first and second pilot carriers to be symmetrically located about a direct current (DC) frequency in the bandwidth of the communication channel; and selecting the third and fourth pilot carriers to be symmetrically located about the DC frequency in the bandwidth of the communication channel.

In some embodiments, the method further comprises: generating the first transmit signal at the first transmit time and generating the second transmit signal at the second transmit time, wherein the first transmit time and the second transmit time are spaced apart in time.

In some embodiments, the method further comprises: selecting the pilot carriers of the first pilot symbol to be located at carrier locations +/−k for multiple spaced k, where k is an integer value; and selecting the pilot carriers of the second pilot symbol to be located at carrier locations +/−j for multiple spaced j, where j is an integer value.

In some embodiments, the method further comprises: transmitting the first transmit signal on a first transmit antenna; and transmitting the second transmit signal on a second transmit antenna.

According to a second aspect of the invention, there is provided a method of transmitting comprising: generating a transmit signal, including a first plurality of data symbols and a first pilot symbol, at a first transmit time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel; and the transmit signal also including a second pilot symbol, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel, the first and third predetermined sample frequencies being sufficiently close such that channel conditions are similar for both the first and third predetermined sample frequencies, and second and fourth predetermined sample frequencies being sufficiently close such that channel conditions are similar for both the second and fourth predetermined sample frequencies; wherein the first and second pilot carriers are symmetrically located about a direct current (DC) frequency in the bandwidth of the communication channel, and the third and fourth pilot carriers are symmetrically located about the DC frequency.

According to a third aspect of the invention, there is provided a method for receiving comprising: receiving a first receive signal, including a first pilot symbol, at a first receive time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel; determining a first value of the first pilot carrier, located at the first predetermined sample frequency, responsive to receiving the first receive signal; determining a second value of the second pilot carrier, located at the second predetermined sample frequency, responsive to receiving the first receive signal; receiving a second receive signal, including a second pilot symbol, at a second receive time that is different from the first receive time, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel; determining a third value of the third pilot carrier, located at the third predetermined sample frequency, responsive to receiving the second receive signal; determining a fourth value of the fourth pilot carrier, located at the fourth predetermined sample frequency, responsive to receiving the second receive signal; generating a distortion estimate based on the first, second, third and fourth values for each of the first, second, third and fourth predetermined sample frequencies.

In some embodiments, the method further comprises: receiving the first receive signal at the first receive time and receiving the second receive signal at the second receive time, wherein the first receive time and the second receive time are spaced apart in time.

In some embodiments, the first predetermined sample frequency and the second predetermined sample frequency correspond to a predetermined positive frequency and a predetermined negative frequency, respectively, and the third predetermined sample frequency and the fourth predetermined sample frequency correspond to a predetermined positive frequency and a predetermined negative frequency, respectively, the third predetermined sample frequency and the fourth predetermined sample frequency being different than the first predetermined sample frequency and the second predetermined sample frequency, respectively.

In some embodiments, the respective predetermined positive frequencies and negative frequencies are symmetrical about a direct current (DC) frequency in the bandwidth of the communication channel and wherein the pilot carriers of the first pilot symbol are located at carrier locations +/−k for multiple spaced k, where k is an integer value, and the pilot carriers of the second pilot symbol are located at carrier locations +/−j for multiple spaced j, where k is an integer value.

In some embodiments, the method further comprises performing the method in an analogous manner for each of a plurality of receive paths in a multi-antenna receiver to generate a distortion estimate for each receive path.

According to a fourth aspect of the invention, there is provided an apparatus comprising: a signal generator adapted to generate pilot symbols located in time and frequency; a transmitter adapted to transmit an orthogonal frequency division multiplexing (OFDM) signal containing the pilot symbols, wherein the signal generator is adapted to: generate a first transmit signal, including a first plurality of data symbols and a first pilot symbol, at a first transmit time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel; and generate a second transmit signal, including a second plurality of data symbols and a second pilot symbol, at a different, second transmit time, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel.

In some embodiments, the signal generator is adapted to select the first and third predetermined sample frequencies to be sufficiently close such that channel conditions are similar for both the first and third predetermined sample frequencies, and to select the second and fourth predetermined sample frequencies to be sufficiently close such that channel conditions are similar for both the second and fourth predetermined sample frequencies; wherein the first and second pilot carriers are symmetrically located about a direct current (DC) frequency in the bandwidth of the communication channel, and the third and fourth pilot carriers are symmetrically located about the DC frequency in the bandwidth of the communication channel.

In some embodiments, the first transmit signal, generated at the first transmit time, and the second transmit signal, generated at the second transmit time, are spaced apart in time.

In some embodiments, the apparatus further comprises: a first transmit antenna for transmitting the first transmit signal and a second transmit antenna for transmitting the second transmit signal.

According to a fifth aspect of the invention, there is provided an apparatus comprising: a signal generator adapted to generate pilot symbols located in time and frequency; a transmitter adapted to transmit an orthogonal frequency division multiplexing (OFDM) signal containing the pilot symbols, wherein the signal generator is adapted to: generate a first transmit signal, including a first plurality of data symbols and a first pilot symbol, at a first transmit time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel; and the transmit signal also including a second pilot symbol, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel, the first and third predetermined sample frequencies being sufficiently close such that similar channel conditions exist for both the first and third predetermined sample frequencies, and the second and fourth predetermined sample frequencies being sufficiently close such similar channel conditions exist for both the second and fourth predetermined sample frequencies; wherein the first and second pilot carriers are symmetrically located about a direct current (DC) frequency in the bandwidth of the communication channel, and the third and fourth pilot carriers are symmetrically located about the DC frequency in the bandwidth of the communication channel.

According to a sixth aspect of the invention, there is provided a receiving apparatus comprising: a distortion estimator adapted to process a received signal to determine a distortion estimate; a distortion compensator adapted to perform distortion compensation on the received signal to produce a corrected signal; and receive circuitry adapted to receive a first receive signal, including a first pilot symbol, at a first receive time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel; wherein the distortion estimator is adapted to: determine a first value of the first pilot carrier, located at the first predetermined sample frequency, responsive to receiving the first receive signal; and determine a second value of the second pilot carrier, located at the second predetermined sample frequency, responsive to receiving the first receive signal; the receive circuitry being further adapted to receive a second receive signal, including a second pilot symbol, at a second receive time that is different from the first receive time, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel; wherein the distortion estimator further: determines a third value of the third pilot carrier, located at the third predetermined sample frequency, responsive to receiving the second receive signal; determines a fourth value of the fourth pilot carrier, located at the fourth predetermined sample frequency, responsive to receiving the second receive signal; and generates a respective distortion estimate based on the first, second, third and fourth values for each of the first, second, third and fourth predetermined sample frequencies.

In some embodiments, the distortion compensator is adapted to perform distortion compensation of the received signal using said distortion estimate to generate a corrected signal.

In some embodiments, the apparatus further comprises: a plurality of receive antennas each having an associated receive path, and adapted to generate a respective distortion estimate for each receive path.

BRIEF DESCRIPTION OF THE DRAWINGS

FIG. 5 illustrates a flowchart describing a method for receiving a communication signal by the receiver, as shown in FIGS. 1 and 4, in accordance with the preferred embodiments of the present invention;

FIG. 9 illustrates a second transmit signal, as shown in FIG. 6, including a second pilot signal, that is transmitted by the transmitter, as shown in FIGS. 1, 2 and 3, at a second time, in accordance with the preferred embodiments of the present invention;

FIG. 10 illustrates the second receive signal, as shown in FIG. 6, including the second pilot signal, that is received by the receiver, as shown in FIGS. 1, 4 and 5, at a second time, in accordance with the preferred embodiments of the present invention;

DETAILED DESCRIPTION OF THE PREFERRED EMBODIMENTS

Figure 1:
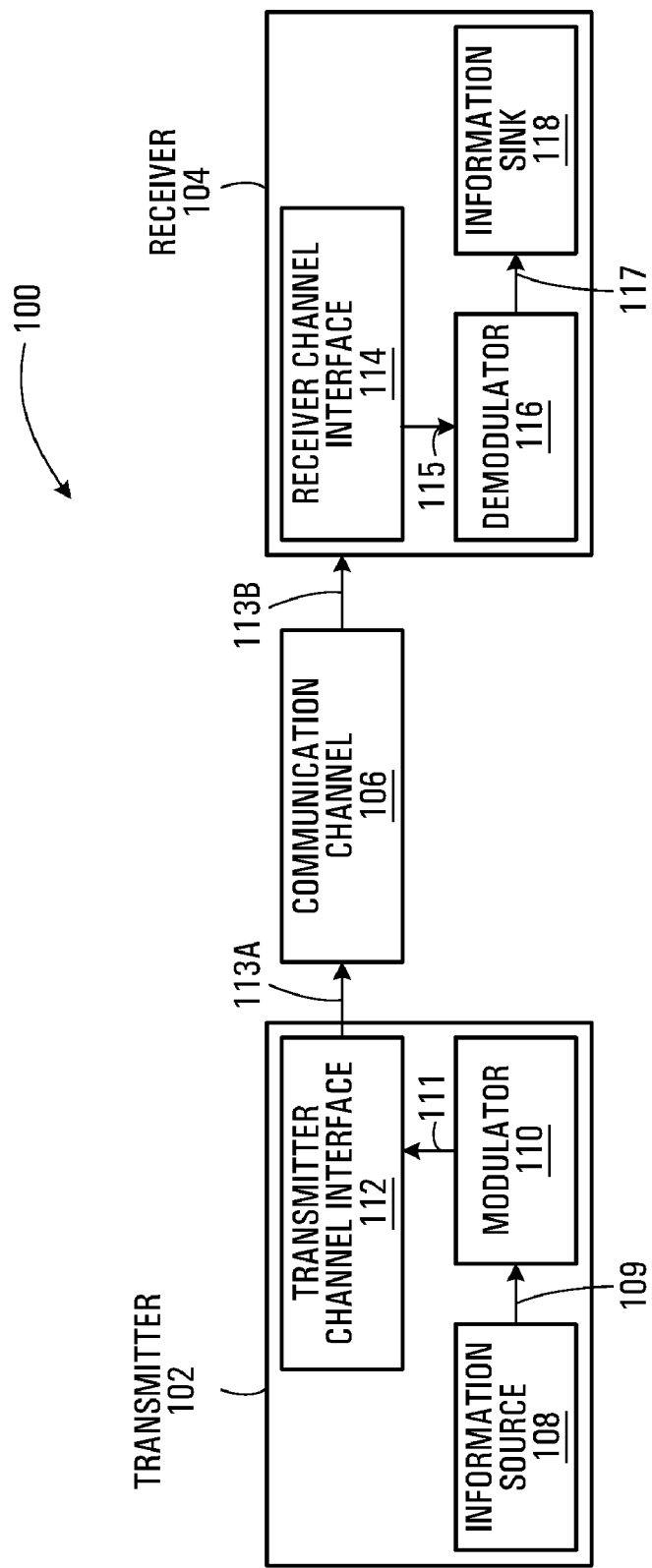
FIG. 1 illustrates a block diagram of a communication system, including a transmitter, a communication channel and a receiver, in accordance with the preferred embodiments of the present invention.

FIG. 1 illustrates a block diagram of a communication system 100, including a transmitter 102, a receiver 104, and a communication channel 106, in accordance with the preferred embodiments of the present invention. The transmitter 102 generally includes an information source 108, a modulator 110, and a transmitter channel interface 112. The receiver generally includes a receiver channel interface 114, a demodulator 116, and an information sink 118.

In the transmitter 102, the information source 108 is electrically coupled to the modulator 110 and adapted to generate a transmit signal stream 109 responsive to receiving an input signal (not shown), which may be generated by an electronic circuit or by a human. The modulator 110 is electrically coupled to the transmitter channel interface 112 and adapted to generate a modulated signal 111 responsive to receiving the transmit signal stream 109. The transmitter channel interface 112 is electrically coupled to the communication channel 106 and adapted to generate a communication signal, represented as a transmit signal 113A, responsive to receiving the modulated signal 111.

In the receiver 104, the receiver channel interface 114 is electrically coupled to the communication channel 106 and adapted to receive the communication signal, represented as a receive signal 113B. The receiver channel interface 114 is electrically coupled to the demodulator 116 and is adapted to generate a receive signal stream 115 responsive to receiving the receive signal 113B. The demodulator 116 is electrically coupled to the information sink 118 and adapted to generate a demodulated signal 117 responsive to receiving the receive signal stream 115. The information sink 118 is adapted to generate an output signal (not shown), which may be received by an electronic circuit or by a human, responsive to receiving the demodulated signal 117.

The communication system 100 is preferably a wireless communication system, such as, for example, a radio or infrared communication system. For a radio communication system, such as a radiotelephone communication system, the transmitter 102 is preferably included in a base station, otherwise known as a base terminal, that is electrically coupled to a wireless or wired communication network, and the receiver 104 is preferably included in a mobile station, otherwise known as a mobile terminal, subscriber unit, radiotelephone, hand phone, portable phone, cellular phone, and the like. Alternatively, the transmitter 102 is included in the subscriber station and the receiver 104 is included in the base station. Alternatively, the transmitter 102 and a receiver, not shown but analogous to the receiver 104, is included in the mobile station, and the receiver 104 and a transmitter, not shown but analogous to the transmitter 102, is included in the base station, to permit full duplex communications between the base station and the subscriber station.

Further, in the wireless case, the communication signals 113A and 113B are preferably radio frequency (RF) signals that require RF circuitry in the transmitter 102 and in the receiver 104. Such RF circuitry in the transmitter channel interface 112 could include an RF up-converter, a power amplifier, a filter, and an antenna, each not shown, but well known to those skilled in the relevant art. Such RF circuitry in the receiver channel interface 114 could include an antenna, a filter, a low noise power amplifier, and a RF down-converter, each not shown, but well known to those skilled in the relevant art. Alternatively, the communication signals 113A and 113B are infrared signals that require infrared circuitry in the transmitter 102 and in the receiver 104.

Still further, in the wireless case, the communication channel 106 is preferably a radio communication channel, as is well known to those skilled in the relevant art. The radio communication channel is susceptible to various types of distortion, otherwise known as interference or disturbance, as described above under the background section. Alternatively, the communication channel 106 is an infrared communication channel, as is well known to those skilled in the relevant art.

Alternatively, the communication system is a wired communication system, such as, for example, an asynchronous digital subscriber line (ADSL) communication system, a cable communication system, or a fiber optic communication system. In this case, the transmitter 102 is preferably included in a network terminal, and the receiver 104 is preferably included in a subscriber terminal, otherwise known as a computer terminal, a desktop computer, a client server, set top box, subscriber unit or station, and the like. Alternatively, the transmitter 102 is included in the subscriber terminal and the receiver 104 is included in the network terminal. Alternatively, the transmitter 102 and a receiver, not shown but analogous to the receiver 104, is included in the subscriber terminal, and the receiver 104 and a transmitter, not shown but analogous to the transmitter 102, is included in the network terminal, to permit full duplex communications between the network terminal and the subscriber terminal.

Further, in the wired case, the communication signals 113A and 113B are preferably discrete multi-tone (DMT) signals, cable signals or fiber optic signals that require appropriate circuitry in the transmitter 102 and in the receiver 104. Such appropriate circuitry in each of the transmitter channel interface 112 and the receiver channel interface 114 could include a signal amplifier, not shown, but well known to those skilled in the relevant art. In the case of the fiber optic signals, the transmitter channel interface 112 and the receiver channel interface 114 could include a laser diode and a photodiode, respectively, as are well known to those skilled in the relevant art.

Still further, in the wired case, the communication channel 106 is preferably a wired communication channel, such as a phone line, a coaxial cable, or fiber optic cable, as is well known to those skilled in the relevant art.

In the communication system 100, the modulator 110 and the transmitter channel interface 112 in the transmitter 102, the communication channel 106, and the receiver channel interface 114 and the demodulator 116 in the receiver 104 may have characteristics or properties that may distort the communication signal. Typically, such distortion typically is greater in an analog modulator and an analog demodulator, when compared to a digital modulator and a digital demodulator, respectively. Further, such distortion typically is greater and more unpredictable for wireless communication channels when compared to wired communication channels. Still further, for radio communication systems, such distortion typically is greater in direct conversion transmitters and direct conversion receivers, when compared to two-stage up-conversion transmitters and two-stage down-conversion receivers, respectively, as described in the background section. Typically, more parts (i.e., two-stage conversion versus direct conversion) and more digital functions (i.e., digital versus analog modulator or demodulator) that are included in the transmitter 102 or the receiver 104 produce or permit less distortion in the communication signal 113B, received and processed by the receiver 104. Hence, engineering tradeoffs exist among cost, parts count, performance, quality, and the like. Any combination of characteristics of the transmitter 102 and the receiver 104 are possible. Analogous and technically appropriate combinations also apply to the case of the wired communication system. For example, in the radio communication case, the transmitter 102 may include a digital modulator 110 and a two-stage up-converter, and the receiver may include a two-stage down-converter and an analog demodulator 116. As another example, in the wired communication case, the transmitter 102 may include a digital modulator 110 and an analog transmitter channel interface 112, and the receiver 104 may include an analog receiver channel interface 114 and an analog demodulator 116. Preferably, the receiver 104 is a direct conversion receiver having an analog demodulator 116 due to its low parts count and corresponding low cost and current drain. Preferably, the transmitter 102 is a direct conversion transmitter having an analog modulator 110 due to its low parts count and corresponding low cost and current drain.

Figure 4:
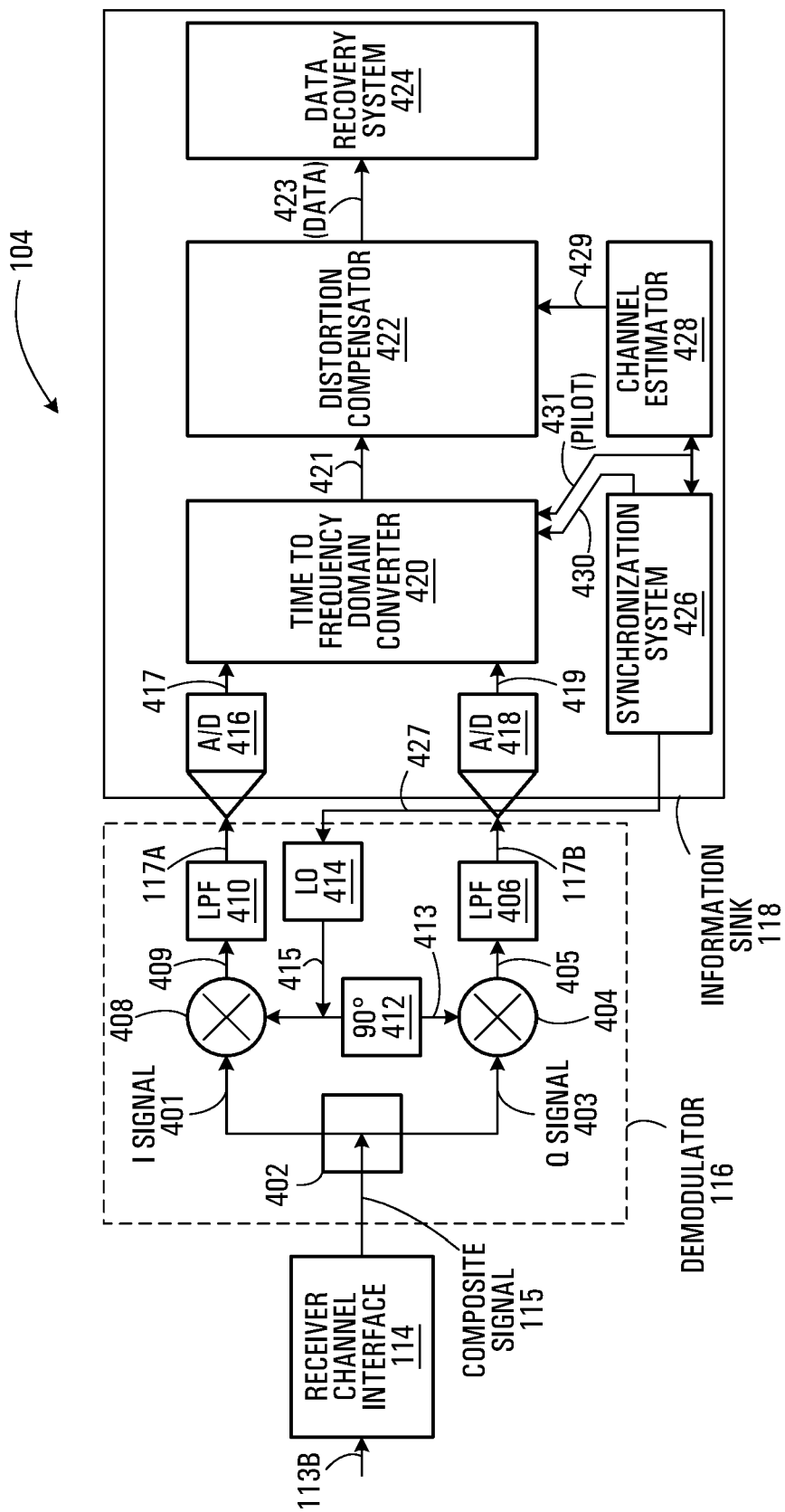
FIG. 4 illustrates a block diagram of the receiver, as shown in FIG. 1, in accordance with the preferred embodiments of the present invention.
Figure 5A:
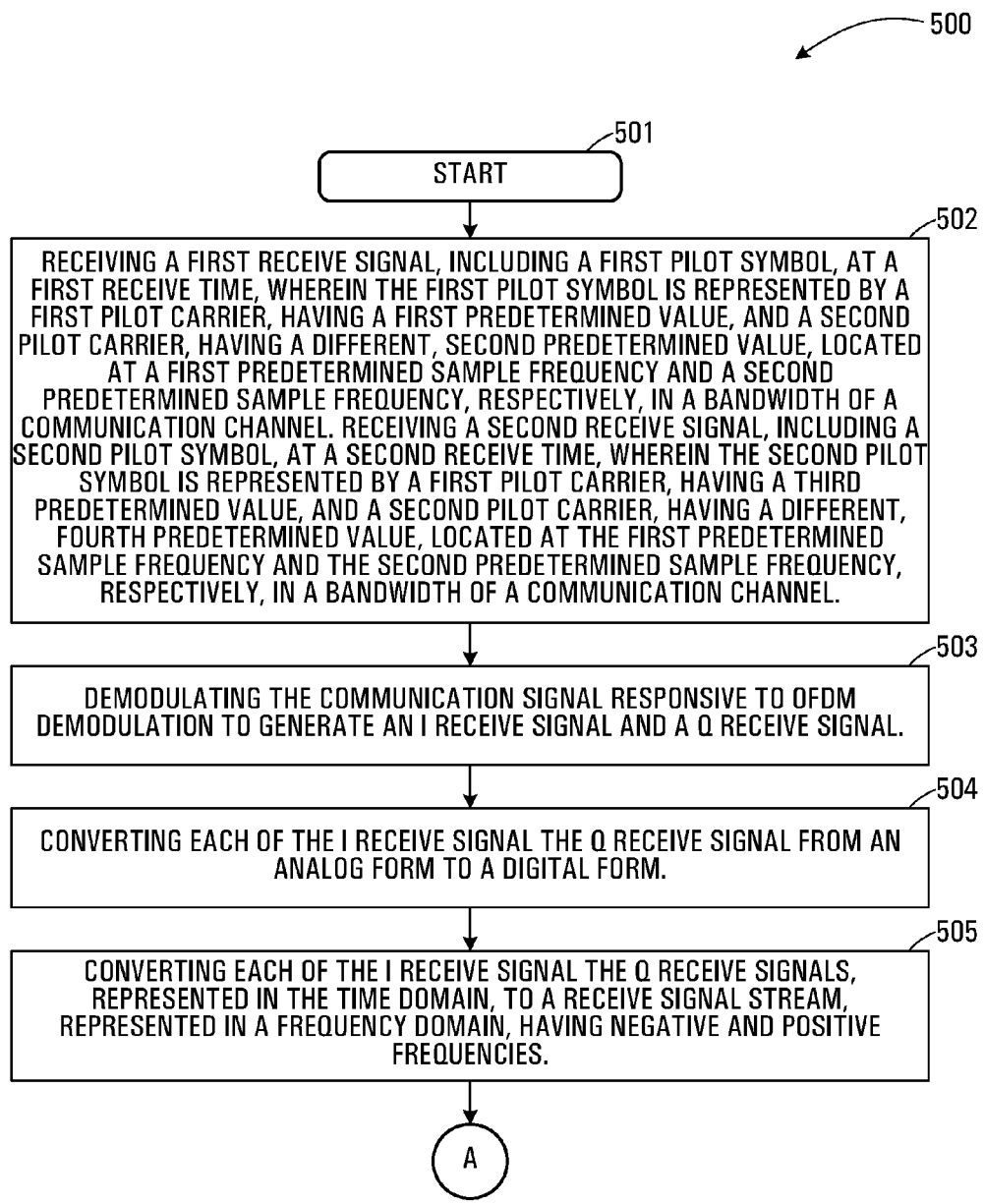
FIGS. 5A and 5B, thereafter
Figure 5B:
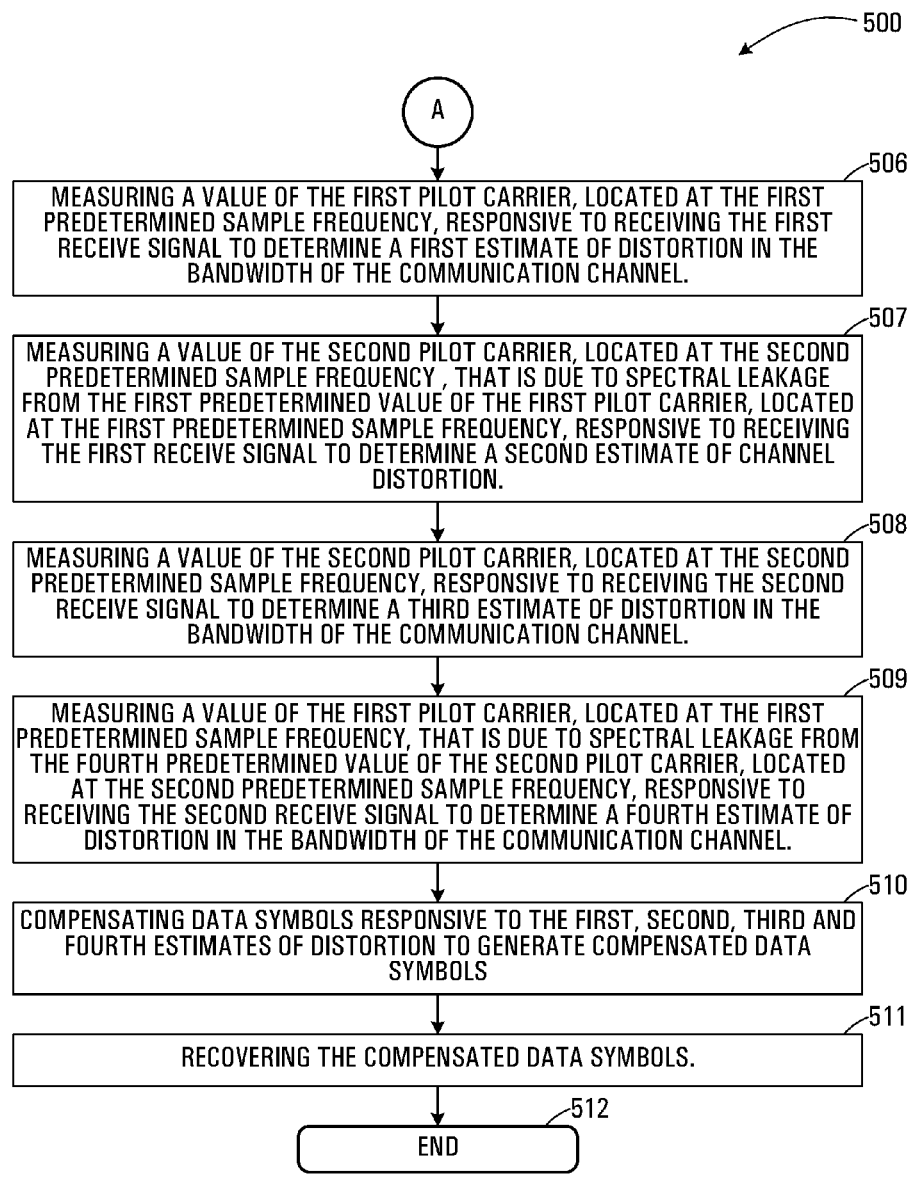
Figure 6:
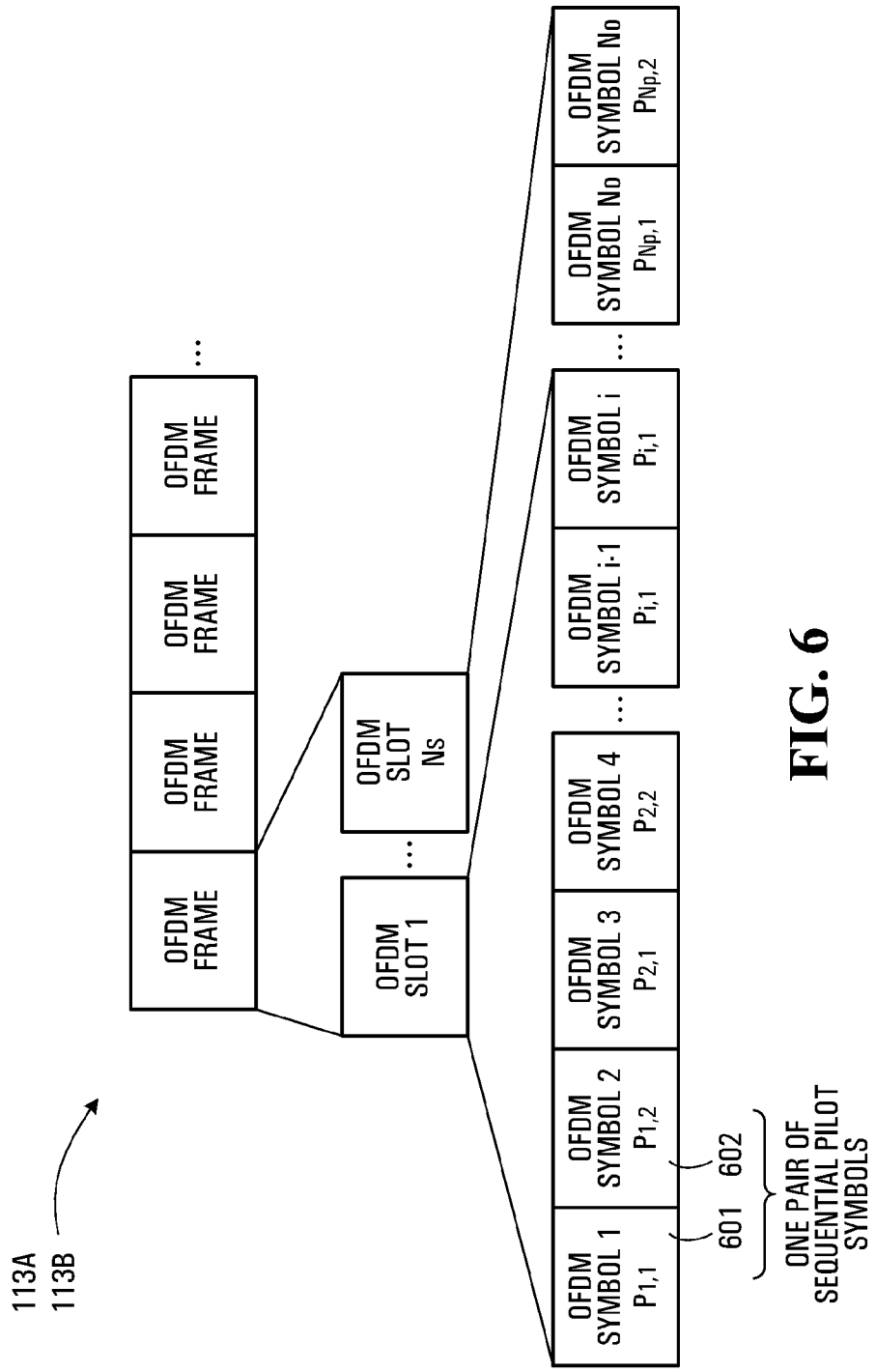
FIG. 6 illustrates the communication signal, including frame, slot and symbol formats, transmitted by the transmitter for reception by the receiver using their respective methods, as shown in FIGS. 1-5, in accordance with the preferred embodiments of the present invention.

Referring briefly to FIG. 6, FIG. 6 illustrates the communication signal 113A and 113B, including frame, slot and symbol formats, transmitted by the transmitter 102 for reception by the receiver 104 using their respective methods, as shown in FIGS. 1-5, in accordance with the preferred embodiments of the present invention. The transmit signal 113A and the receive signal 113B, each representing the communication signal, carry the same information content, but may have different characteristics, such as amplitude or phase, due to distortion caused by the communication channel 106. Preferably, in each of the wireless case and the wired case, the transmit signal 113A is modulated using an orthogonal frequency division multiplex (OFDM) modulation method employed by the transmitter 102, and the receive signal 113B is demodulated using an OFDM demodulation method, as is well known to those skilled in the relevant art. The communication signal, using the OFDM modulation and demodulation methods, may otherwise be called an OFDM signal. The OFDM signal is a complex signal, otherwise called a carrier, including an in-phase (I) signal and a quadrature-phase (Q) signal that are out of phase from each other by 90 degrees (i.e., quadrature), as is well known to those skilled in the relevant art. The complex signal may be represented in polar form, with amplitude and phase components, or in rectangular form, with real and imaginary components, as is well known to those skilled in the relevant art. Both of the amplitude and phase components or both of the real and imaginary components, of the complex signal, each represent a value, otherwise called a parameter, measure, level, amount, and the like, of the complex signal. The OFDM signal generally includes a plurality of sequential frames, wherein each frame further includes a plurality of sequential slots, and wherein each slot further includes a plurality of OFDM symbols. Each OFDM symbol includes data symbols, represented by data carriers or signals in the frequency domain, interspersed among pilot symbols, represented by pilot carriers or signals in the frequency domain, across the bandwidth of the communication channel. Preferably, each carrier is assigned a specific amplitude and phase for the duration of an OFDM symbol period. In the preferred embodiment of the present invention, at least one slot includes at least a first pilot symbol 601 and a second pilot symbol 602. Preferably, the first pilot symbol 601 and the second pilot symbol 602 are sequential in time, but may alternatively be spaced apart in time. Further, although only one pair of two pilot symbols may be transmitted, preferably, multiple pairs of pilot symbols are transmitted over time. Note that the data symbols are not shown interspersed among the pilot symbols for the sake of clarity in the Figure. The following description and related Figures provide a more detailed explanation of the first pilot symbol 601 and the second pilot symbol 602.

Figure 2:
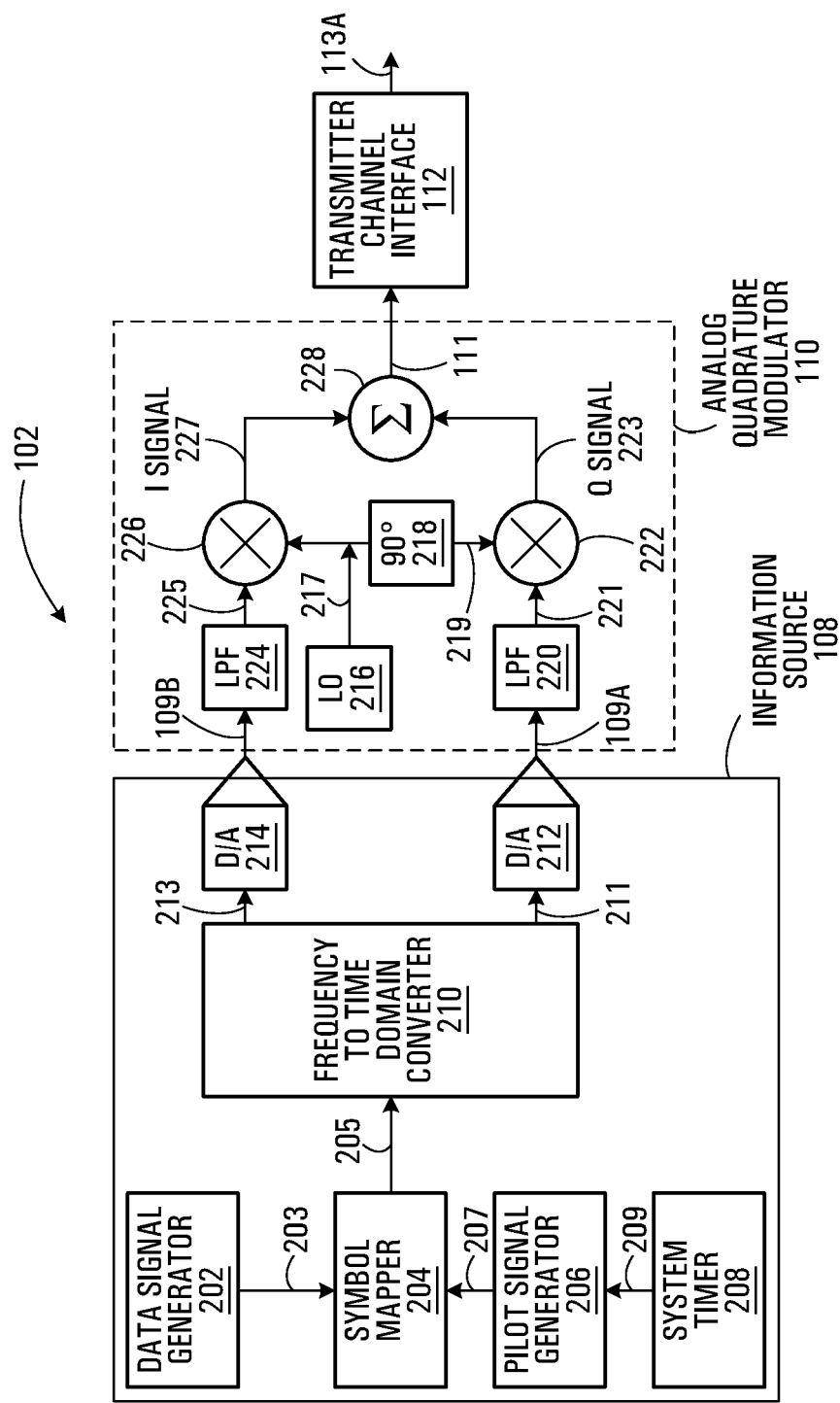
FIG. 2 illustrates a block diagram of the transmitter, as shown in FIG. 1, in accordance with the preferred embodiments of the present invention.

FIG. 2 illustrates a block diagram of the transmitter 102, as shown in FIG. 1, in accordance with the preferred embodiments of the present invention. As shown in FIG. 1, the transmitter 102 includes the information source 108, the modulator 110, and the transmitter channel interface 112. The information source 108 generally includes a data signal generator 202, a symbol mapper 204, a pilot signal generator 206, a system timer 208, a frequency to time domain converter 210, a first digital to analog (D/A) converter 212, and a second digital to analog (D/A) converter 214. The modulator 110 generally includes a local oscillator (LO) 216, a phase shifter 218, a first low pass filter (LPF) 220, a first multiplier 222, a second low pass filter (LPF) 224, a second multiplier 226, and a summer 228. The transmitter channel interface 112 contains parts and functions, as described in FIG. 1.

In the information source 108, the data signal generator 202 generates a data signal 203, represented by a plurality of data symbols, responsive to receiving the input signal, as described with FIG. 1, representing information, such as voice or data (i.e., messages, files, music, video, etc.), as is well known to those skilled in the relevant art.

The pilot signal generator 206 is electrically coupled to the system timer 208 and is adapted to generate at least one pilot signal 207, represented by at least the first pilot symbol 601 and the second pilot symbol 602, responsive to a timing signal 209 generated by the system timer 208. Traditionally and also in the present invention, the pilot signal generator 206 generates pilot signals responsive to the system timer 208 to provide system synchronization and estimation of the communication channel 106, as is well known to those skilled in the relevant art. In other words, the pilot signals, generated by the transmitter 102, are predetermined and expected by the receiver 104 to provide predictability to the transfer of the communication signal. This predictability is needed because the data signal, representing the information being sent, is not predetermined and is not known by the receiver 104, until the receiver 104 receives and processes the communication signal. Preferably, the pilot signals are interspersed among the data signals across the frequency bandwidth of the communication channel to provide known benchmarks from which the receiver 104 determines the accuracy of nearby data signals. Practically, the pilot signal may otherwise be called a predetermined signal, an expected signal, a benchmark signal, a known signal, and the like.

In the preferred embodiments of the present invention, the pilot signals are also advantageously used to correct for distortion generated by the modulator 110 in the transmitter 102 and by the demodulator 116 in the receiver 104. Such distortion, in each of the modulator 110 and the demodulator 116, includes the non-ideal quadrature conversion of the OFDM signals, the non-identical amplitude and phase responses in the I and Q branches, and the non-linear phase characteristics in the low pass filters in each of the I and Q branches, as discussed herein in the background section. In the preferred embodiments of the present invention, the pilot signals are also advantageously used to correct the distortion generated by the communication channel 106 by providing an improved estimate of the communication channel 106. Hence, in the preferred embodiments of the present invention, the pilot signals provide for simultaneous correction of the distortion in the communication channel 106 and in each of the modulator 110 and the demodulator 116.

In the preferred embodiments of the present invention, the pilot signals are also interspersed among the data signals across the frequency bandwidth of the communication channel to provide known benchmarks from which the receiver 104 determines the accuracy of nearby data signals. The distortion in the communication channel 106 and in each of the modulator 110 and the demodulator 116 may be frequency dependent or independent, depending on various characteristics of the same. The differences between the traditional pilot signals and the pilot signals of the present invention, are described with reference to the following Figures, FIGS. 3-11.

Referring back to the information source 108, the symbol mapper 204 is electrically coupled to each of the data signal generator 202 and the pilot signal generator 204 and is adapted to generate a transmit signal stream 205, represented as a digital signal in the frequency domain, responsive to receiving the data symbols 203 from the data signal generator 202 and the pilot symbols 207 from the pilot signal generator 206. The symbol mapper 204 maps the data signal 203 and the pilot signal 207 into the transmit signal stream 205. The mapping function includes interspersing the pilot symbols among the data symbols, as described above, as well as other functions, according to either a predetermined or an adaptive set of rules, steps or parameters.

The frequency to time domain converter 210 is electrically coupled to the symbol mapper 204 and is adapted to generate first time-based signal 213 and a second time-based signal 211, each represented as a digital signal in the time domain, responsive to receiving the transmit signal stream 205, as is well known to those skilled in the relevant art. Preferably, the frequency to time domain converter 210 employs an inverse Fourier transform, but may alternatively employ an inverse discrete cosine transform, an inverse wavelet transform, and the like, each being well known to those skilled in the relevant art. More particularly, the frequency to time domain converter 210 employs an inverse fast Fourier transform (IFFT) and includes a cyclic extension, as is well known to those skilled in the relevant art.

The first D/A converter 212 and the second D/A converter 214 convert the first time-based signal 213 and the second time-based signal 211, respectively, from a digital form to an analog form, represented by a first time-based transmit signal 109A and a second time-based transmit signal 109B, as is well known to those skilled in the relevant art. The first time-based transmit signal 109A and the second time-based transmit signal 109B, together, represent the transmit signal stream 109, as shown in FIG. 1. The sampling rate of each converter 212 and 214 is determined based on various engineering design considerations.

The modulator 110, otherwise known as an analog quadrature modulator, includes a local oscillator (LO) 216 that is adapted to generate a reference signal 217, having a predetermined frequency, for indirect electrical coupling to the first multiplier 222, via the phase shifter 218, and for direct electrical coupling to the second multiplier 226. The phase shifter 218 is adapted to shift the phase of the reference signal 217 by 90 degrees to generate a phase shifted reference signal 219. Hence, the reference signal 217, indirectly coupled to the first multiplier 222, is out of phase by 90 degrees with respect to the reference signal 217, directly coupled to the second multiplier 226. The 90 degrees phase relationship is otherwise known as a quadrature phase relationship, when used with reference to OFDM signals.

The first low pass filter (LPF) 220 is electrically coupled to the first D/A converter 212 and is adapted to generate, by a filtering process, a first filtered signal 221 responsive to receiving the first time-based transmit signal 109A. The first multiplier 222 is electrically coupled to the first low pass filter (LPF) 220 and the phase shifter 218 and is adapted to generate, by a multiplexing process, an in-phase (I) signal 227 responsive to receiving the first filtered signal 221 and the phase shifted reference signal 219.

The second low pass filter (LPF) 224 is electrically coupled to the second D/A converter 214 and is adapted to generate, by a filtering process, a second filtered signal 225 responsive to receiving the second time-based transmit signal 109B. The second multiplier 226 is electrically coupled to the second low pass filter (LPF) 224 and the local oscillator (LO) 216 and is adapted to generate, by a multiplexing process, a quadrature-phase (Q) signal 223 responsive to receiving the second filtered signal 225 and the reference signal 217.

The summer 228 is electrically coupled to the first multiplier 222 and the second multiplier 226 and is adapted to generate, by a summing process, the modulated signal 111, represented as a complex signal in an analog form, responsive to receiving the I signal 227 and the Q signal 223, respectively.

In the modulator 110, the first low pass filter (LPF) 220 and the first multiplier 222 form the Q branch of the modulator 110, and the second low pass filter (LPF) 224 and the second multiplier 226 for the I branch of the modulator 110. The non-ideal quadrature conversion of the OFDM signals, described above, is primarily caused by the local oscillator (LO) 216, the phase shifter 218, the first multiplier 222 and the second multiplier 226. The non-identical amplitude and phase responses in the I and Q branches, described above, is primarily caused by the first low pass filter (LPF) 220 and the first multiplier 222 for the I branch, and of the second low pass filter (LPF) 224 and the second multiplier 226 for the Q branch. The non-linear phase characteristics of the low pass filters, described above, is primarily caused by the first low pass filter (LPF) 220 and the second low pass filter (LPF) 224. The construction and function of the modulator 110 is well known to those skilled in the relevant art.

Figure 3:
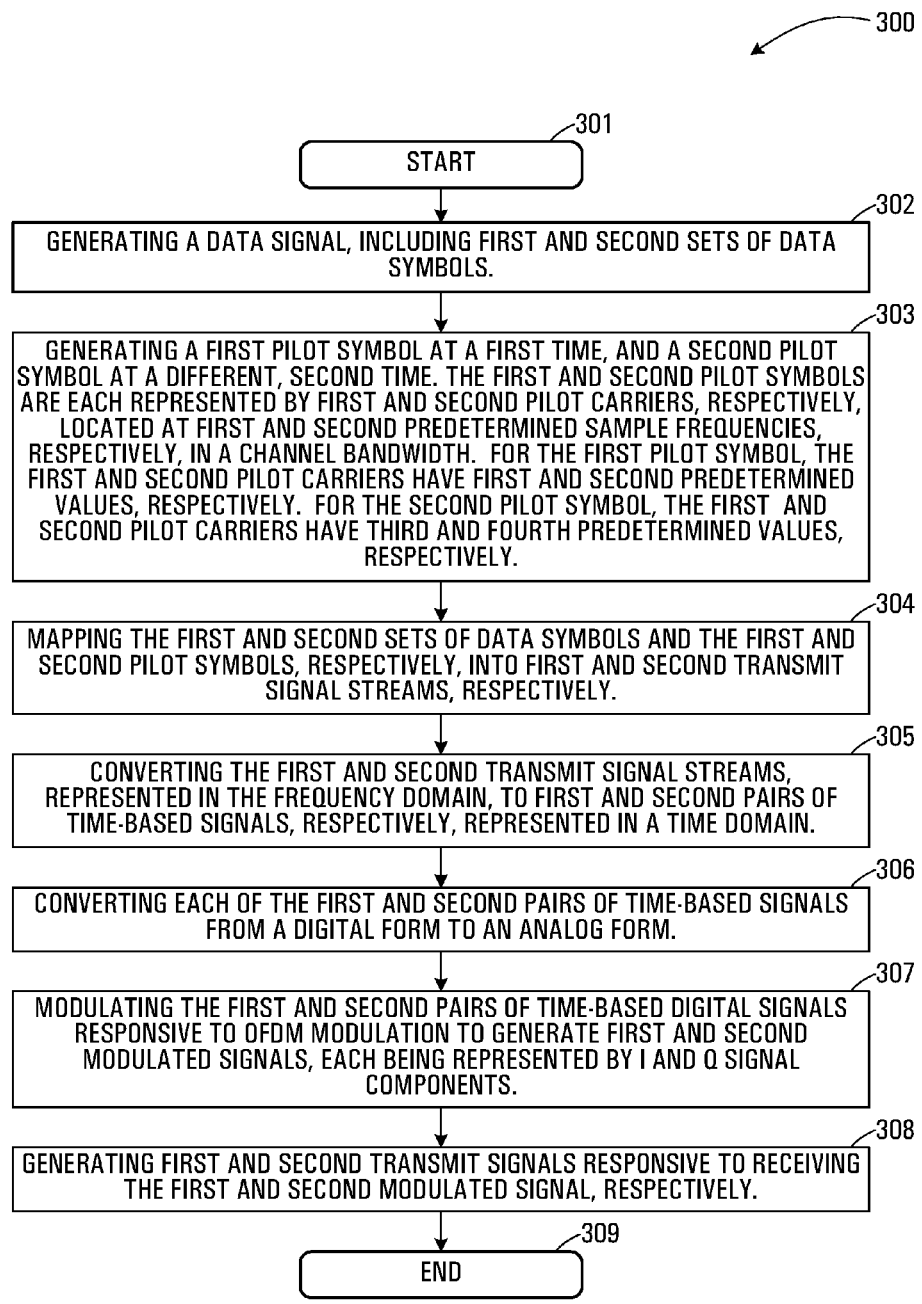
FIG. 3 illustrates a flowchart describing a method for transmitting a communication signal by the transmitter, as shown in FIGS. 1 and 2, in accordance with the preferred embodiments of the present invention.
Figure 7:
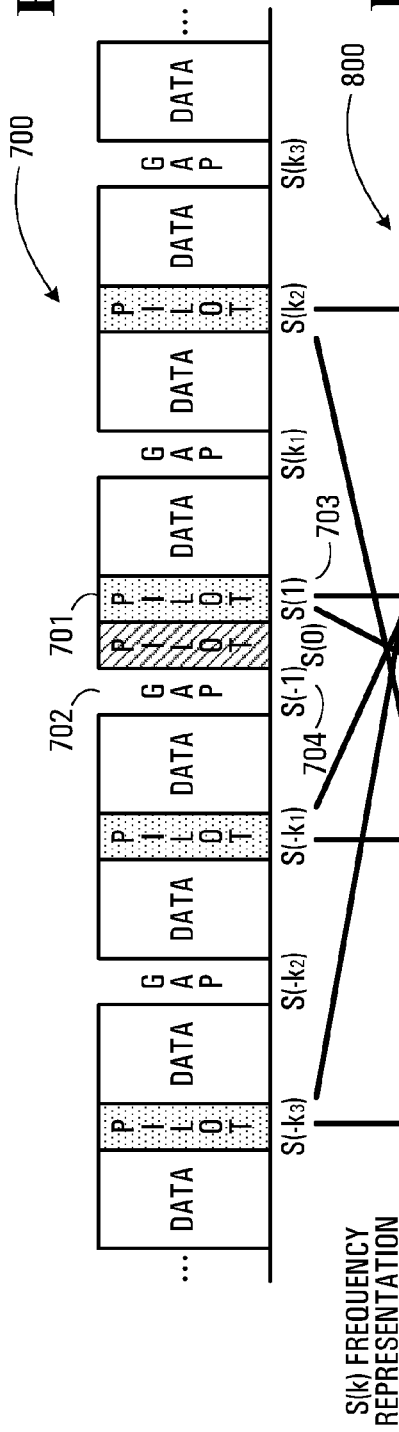
FIG. 7 illustrates a first transmit signal, as shown in FIG. 6, including a first pilot signal, that is transmitted by the transmitter, as shown in FIGS. 1, 2 and 3, at a first time, in accordance with the preferred embodiments of the present invention.

FIG. 3 illustrates a flowchart describing a method 300 for transmitting the communication signal, represented by transmit signal 113A, by the transmitter 102, as shown in FIGS. 1 and 2, in accordance with the preferred embodiments of the present invention. The method 300 is performed by the various components of the transmitter 102, as shown in FIG. 2. The description of the method 300 is supported by reference to the transmit signal 113A, as shown in FIGS. 7 and 9. FIG. 7 illustrates a first transmit signal 700, representing the transmit signal 113A, as shown in FIG. 6, including the first pilot signal, that is transmitted by the transmitter 102, as shown in FIGS. 1, 2 and 3, at a first time, in accordance with the preferred embodiments of the present invention. FIG. 9 illustrates a second transmit signal 900, representing the transmit signal 113A, as shown in FIG. 6, including a second pilot signal, that is transmitted by the transmitter 102, as shown in FIGS. 1, 2 and 3, at a second time, in accordance with the preferred embodiments of the present invention.

At step 301, the method 300 starts.

At step 302, the method 300 performs the step of generating, via the data signal generator 202, the data signal 203, including the plurality of data symbols, represented in the frequency domain and having the digital form.

At step 303, the method 300 performs the step of generating, via the pilot signal generator 206 in cooperation with the system timer 208, one or more pilot signals. Each pilot signal includes at least the first pilot symbol 601 and the second pilot symbol 602, each being represented in the frequency domain and having the digital form. Each of the first 601 and the second 602 pilot symbols is represented by a plurality of pilot carrier pairs located at a plurality of predetermined frequencies across the bandwidth of the communication channel 106 to suitably sample the communication channel 106.

At the first transmit time, the transmitter 102 transmits the first pilot symbol 601, represented by a first pilot carrier of a pilot carrier pair having a first predetermined carrier amplitude and phase (e.g., non-zero), and represented by a second pilot carrier of the pilot carrier pair having a second predetermined carrier amplitude and phase (e.g., zero), at a predetermined positive frequency, e.g., S(1), and a predetermined negative frequency, e.g., S(−1), respectively, corresponding to a first predetermined sample frequency and a second predetermined sample frequency, respectively, as shown in FIG. 7. At the second transmit time, the transmitter 102 transmits the second pilot symbol 602, represented by the first pilot carrier of a pilot carrier pair having a third predetermined carrier amplitude and phase (e.g., zero), and represented by the second pilot carrier of the pilot carrier pair having a fourth predetermined carrier amplitude and phase (e.g., non-zero), at the predetermined positive frequency, e.g., S(1), and a predetermined negative frequency, e.g., S(−1), respectively, corresponding to the first predetermined sample frequency and the second predetermined sample frequency, respectively, as shown in FIG. 9. Note in FIGS. 7 and 9 that the pilot carriers having zero amplitude, are represented by gaps at the particular predetermined frequencies (e.g., the second pilot carrier amplitude at carrier frequency, S(−1), in FIG. 7, and the first pilot carrier amplitude at carrier frequency, S(1) in FIG. 9).

Preferably, the first transmit signal 700 and the second transmit signal 900 are transmitted sequentially in time causing the first pilot symbol 601 and the second pilot symbol 602 also to be transmitted sequentially in time. Sequential pilot symbol transmission minimizes the effect of the communication channel 106 that varies over time, such as with a wireless communication channel.

Preferably, the predetermined positive frequency, e.g., S(1), of the first pilot carrier and the predetermined negative frequency, e.g. S(−1), of the second pilot carrier corresponding to the first predetermined sample frequency and the second predetermined sample frequency, respectively, are symmetrical about a direct current (DC) frequency, S(0), that corresponds to a predetermined DC sample frequency, as shown in FIGS. 7 and 9, but, alternatively, may be asymmetrical if taken into account by the receiver 104. Symmetrical frequencies advantageously permit the receiver 104 to make its determinations more easily. Asymmetrical frequency locations are permissible, but would cause the receiver 104 to make its determinations with more complexity.

Preferably, the first and fourth predetermined carrier amplitudes and the second and third predetermined carrier amplitudes are non-zero and zero, respectively, as shown in FIGS. 7 and 9, respectively, but, alternatively, both may be non-zero, or one may be non-zero but not maximized. The combination of the non-zero amplitude (preferably, maximized) and the zero amplitude advantageously permits the receiver 104 to make its determinations more easily. Pilot carriers with non-zero amplitude (e.g., 20% maximized and 80% maximized), or with the non-zero, non-maximized amplitude and the zero amplitude (e.g., 50% maximized, and 0 value) are permissible, but would cause the receiver 104 to make its determinations with more complexity. Generally, the smaller the difference between the two pilot carriers, the more complex and/or unreliable the receiver's determinations become.

Special consideration is given to the DC frequency, S(0), corresponding to the predetermined sampling point at frequency zero, in FIGS. 7 and 9, since it has no frequency symmetry. At the first time, the transmitter transmits the I signal component of the first pilot symbol 601, having the first predetermined carrier amplitude (e.g., non-zero), and the Q signal component of the first pilot symbol 601, having the second predetermined carrier amplitude (e.g., zero). At the second time, the transmitter transmits the I signal component of the second pilot symbol 602, having the third predetermined carrier amplitude (e.g., zero), and the Q signal component of the second pilot symbol 602, having the fourth predetermined carrier amplitude (e.g., non-zero). Hence, the I and Q signal components of each pilot symbol advantageously provide signal symmetry to permit the receiver 104 to make its determinations at the DC frequency. At the DC frequency, the difference between the first and second predetermined amplitudes may be less than a maximum amount, as described above. The use of the predetermined carriers at the DC frequency is discretionary. Preferably, the predetermined carriers at the DC frequency are used in combination with the predetermined carriers at the positive and negative frequencies. Alternatively, the predetermined carriers at the DC frequency may be used alone without the predetermined carriers at the positive and negative frequencies. Alternatively, the predetermined carriers at the DC frequency may be not used, while using only the predetermined carriers at the positive and negative frequencies. Selection of the appropriate alternative depends on various engineering design considerations (e.g., combination for wireless communication channels with distortion; e.g., alone for wired communication channels with minimal distortion).

Preferably, multiple pilot carriers are distributed among the data carriers in the first transmit signal 700 and the second transmit signal 900, as shown in FIGS. 7 and 9. The number of pilot carriers and the frequency of the pilot carriers may be fixed or variable during a communication session between the transmitter 102 and the receiver 104, depending on various engineering design considerations (e.g., fixed for the wired communication channel, and variable for the wireless communication channel; e.g., more for communication channels with more distortion, and less for communication channels with less distortion). Multiple pilot carriers, distributed among the data carriers across the communication channel 106, advantageously permit the receiver 104 to provide more accurate distortion compensation determinations for the nearby data symbols. Preferably, when multiple pilot carriers are employed, the value of the pilot carriers alternates between the non-zero amplitude and phase and the zero amplitude and phase among the data carriers across the channel bandwidth, as shown in FIGS. 7 and 9, to permit the receiver 104 to make the most reliable determinations for the nearby data symbols. Generally, it is preferable to minimize the number of pilot carriers sent to reduce the data throughput over the communication channel, while maximizing the distortion correction.

Preferably, the pilot signals, as shown in FIGS. 7 and 9, are used for synchronization and channel estimation, using methods that are well known to those skilled in the relevant art, in combination with being used for the present invention.

The transmitter 104 may transmit multiple pilot signals over time, each having at least two pilot symbols, to permit the receiver 104 to make more frequent determinations regarding the level and/or frequency of the distortion. Various fixed or adaptive methods may be employed using multiple pilot signals to achieve various goals, depending on various engineering considerations. For example, a first pilot signal, having at least two pilot symbols, may be sent to make a large, or gross, correction in the distortion, followed by other pilot signals, each having at least two pilot symbols, to make smaller, or fine tune, corrections in the distortion.

At step 304, the method 300 symbol mapper 204 maps the data symbols of the data signal 203 and the first pilot symbol and the second pilot symbol of the pilot signal 207 into the transmit signal stream 205, represented in the frequency domain and having the digital form.

At step 305, the method 300 performs the step of converting, via the frequency to time domain converter 210, the transmit signal stream 205, represented in the frequency domain, to the first time-based signal 211 and the second time-based signal 213, each represented in a time domain and having the digital form.

At step 306, the method 300 performs the step of converting, the first digital to analog (D/A) converter 212 and the second digital to analog (D/A) converter 214, the first time-based signal 211 and the second time-based signal 213, respectively, from a digital form to an analog form, represented by the first time-based transmit signal 109A and the second time-based transmit signal 109B.

At step 307, the method 300 performs the step of modulating, via the modulator 110, the first time-based transmit signal 109A and the second time-based transmit signal 109B responsive to the OFDM modulation method to generate the modulated signal 111, having the analog form.

At step 308, the method 300 performs the step of generating, via the transmitter channel interface 112, the communication signal, having the analog form, responsive to receiving the modulated signal 111.

At step 309, the method 300 ends.

FIG. 4 illustrates a block diagram of the receiver, as shown in FIG. 1, in accordance with the preferred embodiments of the present invention. As shown in FIG. 1, the receiver generally includes the receiver channel interface 114, the demodulator 116, and the information sink 118. The receiver channel interface 114 contains parts and functions, as describe in FIG. 1. The demodulator 110 generally includes a local oscillator (LO) 414, a phase shifter 412, a first low pass filter (LPF) 406, a first multiplier 404, a second low pass filter (LPF) 410, a second multiplier 408, and a splitter 402. The information sink 118 generally includes a first analog to digital (A/D) converter 418, a second analog to digital (A/D) converter 416, a time to frequency domain converter 420, a distortion compensator 422, a data recovery system 424, a synchronization system 426, and a channel estimator 428.

In the demodulator 116, otherwise known as an analog quadrature demodulator, the local oscillator (LO) 414 is adapted to generate a reference signal 415, having a predetermined frequency, for indirect electrical coupling to the first multiplier 404, via the phase shifter 412, and for direct electrical coupling to the second multiplier 408. The phase shifter 412 is adapted to shift the phase of the reference signal 415 by 90 degrees to generate a phase shifted reference signal 413. Hence, the reference signal 415, indirectly coupled to the first multiplier 404, is out of phase by 90 degrees with respect to the reference signal 415, directly coupled to the second multiplier 408. The 90 degrees phase relationship is otherwise known as a quadrature phase relationship, when used with reference to OFDM signals.

The splitter 402 is electrically coupled to the receiver channel interface 114 and is adapted to generate, by a splitting process, an I path receive signal 401 and a Q path receive signal 403, each in analog form, responsive to receiving the composite receive signal 115, in analog form, from the receiver channel interface 114.

The first multiplier 404 is electrically coupled to the splitter 402 and is adapted to generate, by a multiplexing process, a first multiplied signal 405 responsive to receiving the Q path receive signal from the splitter 402 and the phase shifted reference signal 413 from the phase shifter 412. The first low pass filter (LPF) 406 is electrically coupled to the first multiplier 404 and is adapted to generate, by a filtering process, a first filtered signal 117B, representing a first component 117A of the demodulated signal 117 of FIG. 1, responsive to receiving the first multiplied signal 405 from the first multiplier 404.

The second multiplier 408 is electrically coupled to the splitter 402 and is adapted to generate, by a multiplexing process, a second multiplied signal 409 responsive to receiving the I path receive signal from the splitter 402 and the reference signal 415 from the local oscillator (LO) 414. The second low pass filter (LPF) 410 is electrically coupled to the second multiplier 408 and is adapted to generate, by a filtering process, a second filtered signal 117A, representing a second component 117B of the demodulated signal 117, responsive to receiving the second multiplied signal 409 from the second multiplier 404. The construction and function of the demodulator 116 is well known to those skilled in the relevant art.

In the demodulator 116, the first low pass filter (LPF) 406 and the first multiplier 404 form the Q branch of the demodulator 116, and the second low pass filter (LPF) 410 and the second multiplier 408 for the I branch of the demodulator 116. The non-ideal quadrature conversion of the OFDM signal, described above, is primarily caused by the local oscillator (LO) 414, the phase shifter 412, the first multiplier 404 and the second multiplier 408. The non-identical amplitude and phase responses in the I and Q branches, described above, is primarily caused by the first low pass filter (LPF) 406 and the first multiplier 404 for the Q branch, and the second low pass filter (LPF) 410 and the second multiplier 408 for the I branch. The non-linear phase characteristics in the low pass filters in the Q and I branches is primarily caused by first low pass filter (LPF) 406 and the second low pass filter (LPF) 410 in the Q and I branches, respectively.

In the information sink 118, the first analog to digital (A/D) converter 418 and the second analog to digital (A/D) converter 416 convert the first component 117A of the demodulated signal 117 and the second component 117B of the demodulated signal 117, respectively, from an analog form to a digital form, represented by a first time-based receive signal 419 and the second time-based receive signal 417, as is well known to those skilled in the relevant art. The sampling rate of each converter 416 and 418 is determined based on various engineering design considerations.

The time to frequency domain converter 420 is electrically coupled to the first analog to digital (A/D) converter 418 and the second analog to digital (A/D) converter 416 and is adapted to generate a receive signal stream 421, representing data as a digital signal in the frequency domain, responsive to receiving the first time-based receive signal 419 and the second time-based receive signal 417, as is well known to those skilled in the relevant art. Preferably, the time to frequency domain converter 420 employs a Fourier transform, but may alternatively employ an discrete cosine transform, an wavelet transform, and the like, each being well known to those skilled in the relevant art. More particularly, the time to frequency domain converter 420 employs a fast Fourier transform (FFT), as is well know to those skilled in the relevant art.

The synchronization system 426 is electrically coupled to the time to frequency domain converter 420, and is adapted to generate a first 427 and a second 430 synchronization signal for the local oscillator (LO) 414 and the time to frequency domain converter 420, respectively, responsive to receiving a pilot signal 431 from the time to frequency domain converter 420. The synchronization system 426 synchronizes the receiver 104 to the phase and frequency of the receive signal 113B, as well as performs other functions. The construction and function of the synchronization system 426 is well known to those skilled in the relevant art.

The channel estimator 428 is electrically coupled to the time to frequency domain converter 420, and is adapted to generate an estimate 429 of the communication channel 106 responsive to receiving the pilot signal 431 from the time to frequency domain converter 420.

The distortion compensator 422 is electrically coupled to the time to frequency domain converter 420 and the channel estimator 428, and is adapted to generate a compensated receive signal 423 responsive to receiving the receive signal stream 421 from the time to frequency domain converter 420 and estimate 429 of the communication channel 106 from the channel estimator 428. Generally, the distortion compensator 422 compensates the distortion in the receive signal stream 421 that were caused by the various types of distortion, described herein, to thereby improve the quality of the receive signal stream 421. The function of the distortion compensator 422 is described with reference to FIG. 5.

The data recovery system 424 generates the output signal (not shown), representing information, such as voice or data (i.e., messages, files, music, video, etc.), as described with FIG. 1, responsive to receiving the compensated receive signal stream 423, as is well known to those skilled in the relevant art.

Figure 8:
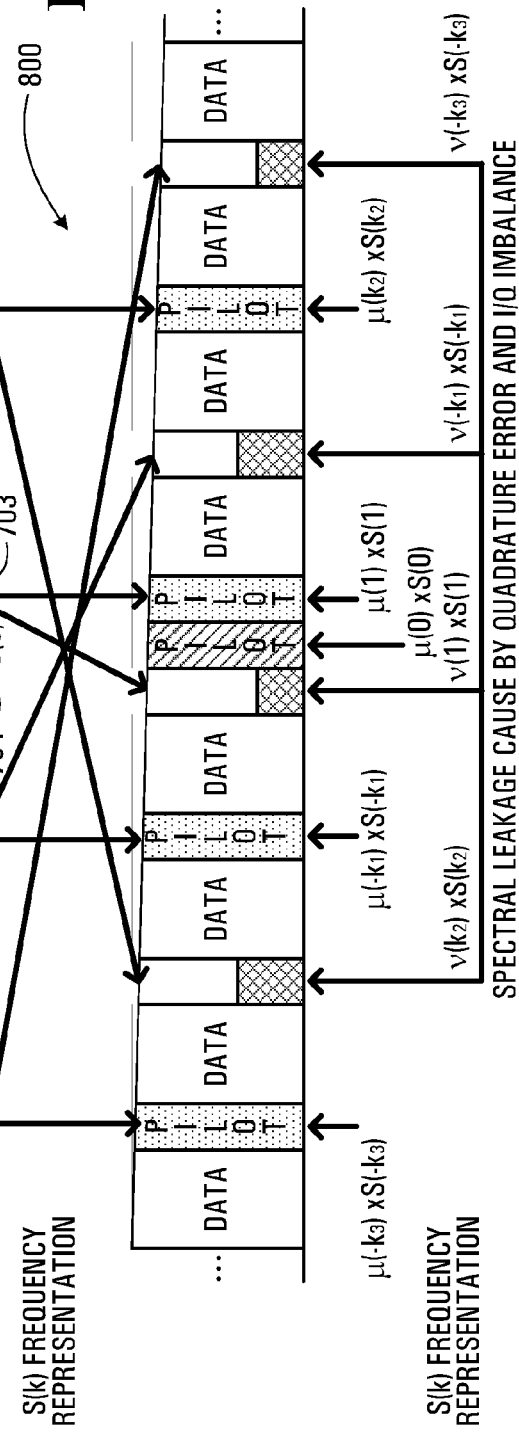
FIG. 8 illustrates the first receive signal, as shown in FIG. 6, including the first pilot signal, that is received by the receiver, as shown in FIGS. 1, 4 and 5, at a first time, in accordance with the preferred embodiments of the present invention.
Figure 11A:
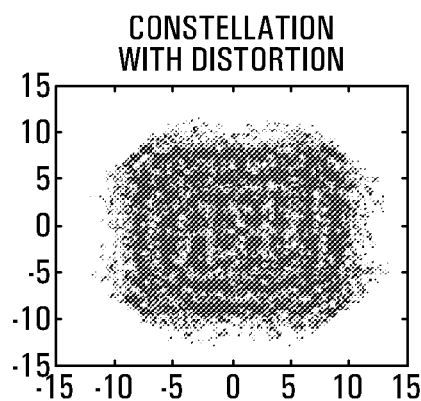
FIGS. 11A-11D illustrate a constellation with distortion, a constellation with corrected positive frequencies, a constellation with corrected negative frequencies, and a corrected constellation, in accordance with the preferred embodiments of the present invention.
Figure 11B:
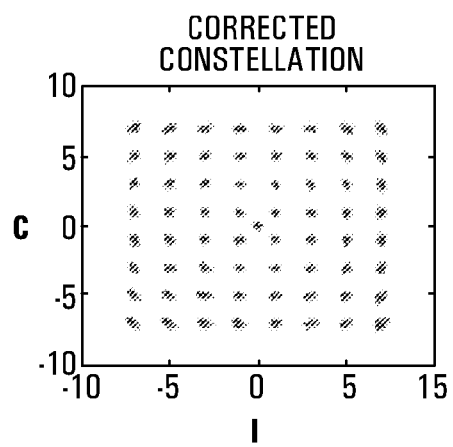
Figure 11C:
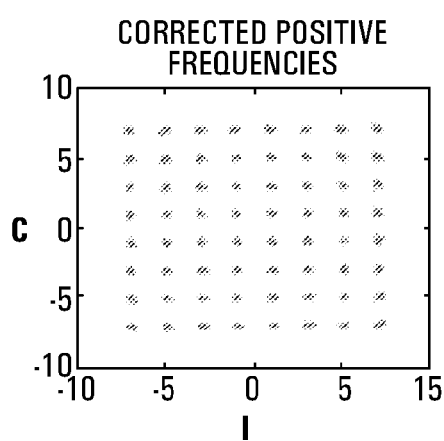
Figure 11D:
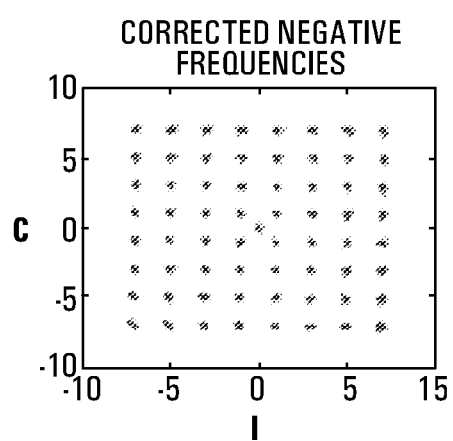

FIG. 5 illustrates a flowchart describing a method 500 for receiving the communication signal, represented by the receive signal 113B, by the receiver 104, as shown in FIGS. 1 and 4, in accordance with the preferred embodiments of the present invention. The method 500 is performed by the various components of the receiver 104, as shown in FIG. 4. The description of the method 500 is supported by reference to the receive signal 113B, as shown in FIGS. 8 and 10. FIG. 8 illustrates the first receive signal 800, representing the receive signal 113B, as shown in FIG. 6, including the first pilot signal, that is received by the receiver 104, as shown in FIGS. 1, 4 and 5, at a first time, in accordance with the preferred embodiments of the present invention. FIG. 10 illustrates the second receive signal 1000, representing the receive signal 113B, as shown in FIG. 6, including the second pilot signal, that is received by the receiver 102, as shown in FIGS. 1, 4 and 5, at a second time, in accordance with the preferred embodiments of the present invention.

At step 501, the method 500 starts.

At step 502, the method 500 performs the step of receiving, by the receiver channel interface 114, the receive signal 113B, represented in the time domain and having the analog form, including the data signal and the pilot signal to generate the composite receive signal 115. More particularly, the receive signal 113B represents each of the first receive signal 800, as shown in FIG. 8, and the second receive signal 1000, as shown in FIG. 10, corresponding to a first and second composite receive signal, respectively. The first receive signal 800, received at a first receive time, includes the first pilot symbol 601, represented by the first pilot carrier of the pilot carrier pair having the first predetermined carrier amplitude and phase (e.g., non-zero), and represented by the second pilot carrier of the pilot carrier pair having the second predetermined carrier amplitude and phase (e.g., zero), at the predetermined positive frequency, e.g., S(1), and the predetermined negative frequency, e.g., S(−1), respectively, corresponding to the first predetermined sample frequency and the second predetermined sample frequency, respectively, as shown in FIG. 8. The second receive signal 1000, received at a second receive time includes the second pilot symbol 602, represented by the first pilot carrier of the pilot carrier pair having the third predetermined carrier amplitude and phase (e.g., zero), and represented by the second pilot carrier of the pilot carrier pair having the fourth predetermined carrier amplitude and phase (e.g., non-zero), at the predetermined positive frequency, e.g., S(1), and the predetermined negative frequency, e.g., S(−1), respectively, corresponding to the first predetermined sample frequency and the second predetermined sample frequency, respectively, as shown in FIG. 10.

At step 503, the method 500 performs the step of demodulating, by the demodulator 116, the composite receive signal 115 responsive to an OFDM demodulation method to generate the first component 117A of the demodulated signal 117, representing the Q receive signal 403, and the second component 117B of the demodulated signal 117, representing the I receive signal 401, each having an analog form. This step is performed for each of the first 800 and second 1000 receive signals processed by the demodulator 116.

At step 504, the method 500 performs the step of converting, by the first analog to digital (A/D) converter 418 and the second analog to digital (A/D) converter 416, the first component 117A of the demodulated signal 117 and the second component 117B of the demodulated signal 117, respectively, from an analog form to a digital form, represented by a first time-based receive signal 419 and the second time-based receive signal 417. This step is performed for each of the first 800 and second 1000 receive signals processed by the first analog to digital (A/D) converter 418 and the second analog to digital (A/D) converter 416.

At step 505, the method 500 performs the step of generating, by the time to frequency domain converter 420, the receive signal stream 421, represented as the digital signal in the frequency domain, responsive to receiving the first time-based receive signal 419 and the second time-based receive signal 417. This step is performed for each of the first 800 and second 1000 receive signals processed by the time to frequency domain converter 420.

At steps 506-510, the method generally performs the step of generating, using the distortion compensator 422 and the channel estimator 428, the compensated receive signal 423 responsive to receiving the receive signal stream 421 from the time to frequency domain converter 420 and estimate 429 of the communication channel 106 from the channel estimator 428.

At step 506, the method 500 performs the step of measuring a value of the first pilot carrier, located at the first predetermined sample frequency, responsive to receiving the first receive signal 800 to determine a first estimate of distortion in the bandwidth of the communication channel. FIG. 8 shows frequency dependent channel distortion represented by a downward slope from left to right across the communication channel. The shape, direction, and magnitude, etc. of the slope represent the frequency distortion across the communication channel and should not be interpreted as limiting. The receiver measures the values of the pilot carriers at various predetermined frequencies, across the frequency bandwidth of the communication channel, which are expected to have non-zero amplitude to determine the frequency dependent channel distortion. The method 500 measures the amplitude and phase of the first pilot carrier at the predetermined positive frequency, e.g., S(1), corresponding to the first predetermined sample frequency, having a non-zero amplitude responsive to receiving the first receive signal 800. Preferably, as shown in FIG. 8, the amplitude and phase of the pilot carriers are measured for each of the predetermined sample frequencies, across the frequency bandwidth of the communication channel that are expected to be non-zero. Preferably, the first estimate of channel distortion is represented by a first set of coefficients, e.g. $\mu(k)$.

At step 507, the method 500 performs the step of measuring the amplitude and phase of the second pilot carrier at the predetermined negative frequency, e.g., S(−1), corresponding to the second predetermined sample frequency that is due to the spectral leakage from the first predetermined carrier amplitude and phase (e.g., non-zero) at the predetermined positive frequency, e.g., S(1), corresponding to the first predetermined sample frequency, as shown in FIG. 8, responsive to receiving the first receive signal 800 to determine a second estimate of channel distortion across the frequency bandwidth of the communication channel. Preferably, the second estimate of channel distortion is represented by a second set of coefficients, e.g. $\nu(k)$. Spectral leakage is otherwise called channel distortion, image frequency distortion or leakage, and the like, and represents an amount of a pilot carrier that leaks from its predetermined frequency into its corresponding image frequency (i.e., leakage from negative frequency to positive frequency, or positive frequency to negative frequency).

Ideally, in FIG. 8, the amplitude of the second pilot carrier at the predetermined negative frequency, e.g., S(−1), corresponding to the second predetermined sample frequency should be zero when there is no spectral leakage. However, by example, FIG. 8 shows the amplitude of the pilot carrier at the predetermined negative frequency, e.g., S(−1), corresponding to the second predetermined sample frequency, being non-zero. This non-zero amplitude represents the distortion at the predetermined negative frequency, e.g., S(−1). Preferably, as shown in FIG. 8, the amplitude and phase of the pilot carrier are measured at each of the predetermined sample frequencies (including the DC frequency), across the frequency bandwidth of the communication channel.

In particular, at the DC frequency, S(0), corresponding to the predetermined sample frequency, the method 500 measures the amplitude and phase of the I and Q signal components of the first pilot symbol 601 responsive to receiving the first receive signal 800 to determine a first and second estimate of channel distortion, respectively, e.g. $\mu_r$ and $\nu_r$, respectively. Ideally, the amplitude of the Q signal component of the first pilot symbol 601 at the DC frequency should be zero when there is no spectral leakage. A non-zero amplitude represents the distortion at the DC frequency, S(0).

At step 508, the method 500 performs the step of measuring a value of the second pilot carrier, located at the second predetermined sample frequency, responsive to receiving the second receive signal to determine a third estimate of distortion in the bandwidth of the communication channel. FIG. 10 also shows frequency dependent channel distortion represented by a downward slope from left to right across the communication channel. The shape, direction, magnitude, etc. of the slope represent the frequency distortion across the communication channel and should not be interpreted as limiting. The receiver measures the values of the pilot carriers at various predetermined frequencies, across the frequency bandwidth of the communication channel, which are expected to have non-zero amplitude to determine the frequency dependent channel distortion. The method 500 measures the amplitude and phase of the second pilot carrier at the predetermined negative frequency, e.g., S(−1), corresponding to the second predetermined sample frequency, having a non-zero, e.g., S(−1), responsive to receiving the second receive signal 1000. Preferably, as shown in FIG. 10, the amplitude and phase, e.g. S(−1), of the second pilot carrier is measured for each of the predetermined sample frequencies, across the frequency bandwidth of the communication channel. Preferably, the third estimate of channel distortion is represented by the first set of coefficients, e.g. $\mu(-k)$.

At step 509, the method 500 performs the step of measuring the amplitude and phase of the first pilot carrier at the predetermined positive frequency, e.g., S(1), corresponding to the first predetermined sample frequency that is due to the spectral leakage from the fourth predetermined carrier amplitude (e.g., non-zero) of the second pilot carrier at the predetermined negative frequency, e.g., S(−1), corresponding to the second predetermined sample frequency, as shown in FIG. 10, responsive to receiving the second receive signal 900 to determine a fourth estimate of channel distortion across the frequency bandwidth of the communication channel. Preferably, the fourth estimate of channel distortion is represented by the second set of coefficients, $\nu(-k)$.

Ideally, in FIG. 10, the amplitude of the first pilot carrier at the predetermined positive frequency, e.g., S(1), corresponding to the first predetermined sample frequency, should be zero when there is no spectral leakage. However, by example, FIG. 10 shows the amplitude of the pilot carrier at the predetermined positive frequency, e.g., S(1), corresponding to the first predetermined sample frequency, having a non-zero amplitude. This non-zero amplitude represents the distortion at the predetermined positive frequency, e.g., S(1). Preferably, as shown in FIG. 10, the amplitude and phase of the first pilot carrier is measured for all of the pilot carrier pairs at each of the predetermined sample frequencies (including the DC frequency), across the frequency bandwidth of the communication channel.

In particular, at the DC frequency, S(0), corresponding to a predetermined sample frequency, the method 500 measures the amplitude and phase of the I and Q signal components of the second pilot symbol 602 responsive to receiving the second receive signal 1000 to determine a fourth and third estimates of channel distortion, respectively, e.g. $\mu_i$ and $\nu_i$, respectively. Ideally, the amplitude of the I signal component of the second pilot symbol 602 at the DC frequency should be zero when there is no spectral leakage. A non-zero amplitude represents the distortion at the DC frequency, S(0).

At step 510, the method 500 performs the step of compensating the data signal across the frequency bandwidth of the communication channel responsive to the first, second, third and fourth estimates of distortion to generate a plurality of compensated data symbols 423.

At step 510, the method 500 performs the step of recovering, by the data recovery system 424, the compensated received signal 423.

At step 511, the method 500 ends.

The following equations and analysis describe steps performed in FIG. 5.

The values of the k and −k frequency carrier bins (or carriers) of the FFT of the received OFDM signal, S'(k) and S'(−k), respectively, are written as a combination of the values of the k and −k frequency carrier bins of the transmitted OFDM symbol, S(k) and S(−k), respectively, according to the following equations:

$$S'(k)=\mu(k)S(k)+\nu(-k)S^*(-k), \text{and}$$

$$S'(-k)=\mu(-k)S(-k)+\nu(k)S^*(k),$$

wherein:
* denotes complex conjugation, and
$\mu(k)$, $\mu(-k)$, $\nu(-k)$, $\nu(-k)$ are complex valued distortion coefficients.

An estimate of the transmitted OFDM symbol is obtained by solving for S(k) and S(−k), using estimates of the $\mu$ and $\nu$ parameters.

For k=0:

$$\begin{bmatrix} \text{Real}(S_r(0)) \\ \text{Imag}(S_r(0)) \end{bmatrix} = \begin{bmatrix} \mu_r(0) & \nu_i(0) \\ \nu_r(0) & \mu_i(0) \end{bmatrix} \begin{bmatrix} \text{Real}(S(0)) \\ \text{Imag}(S(0)) \end{bmatrix}$$

Estimates of $\mu(k)$, $\mu(-k)$, $\nu(-k)$, $\nu(-k)$ are obtained for various values of k and −k by transmitting known values of S(k) and S(−k), i.e. pilot carriers, over two OFDM symbols.

If, for the first OFDM symbol, the magnitude of S(−k) is 0 or sufficiently small, then the value of the k and −k FFT bins of the received OFDM symbol, S'(k) and S'(−k) are represented by the following equations:

$$S'(k)=\mu(k)S(k), \text{and}$$

$$S'(-k)=\nu(k)S^*(k).$$

These equations are solved for estimated values of $\mu(k)$ and $\nu(k)$, according to the following equations:

$$\mu(k)=S'(k)/S(k), \text{and}$$

$$\nu(k)=S'(-k)/S^*(k).$$

For the first OFDM symbol the value of S(k) is chosen to minimize the error in forming the estimates of $\mu(k)$ and $\nu(k)$.

If, for the second OFDM symbol, the magnitude of S(k) is 0 or sufficiently small, then upon reception of the second OFDM symbol, the distortion estimated values of $\mu(-k)$ and $\nu(-k)$ may be represented by the following equations:

$$\mu(-k)=S'(-k)/S(-k), \text{and}$$

$$\nu(-k)=S'(k)/S^*(-k).$$

For the second OFDM symbol the value of S(−k) are chosen to minimize the error in forming the estimates of $\mu(-k)$ and $\nu(-k)$.

When the channel is suitably sampled with pilot carriers then estimates of the distortion coefficients $\mu$, $\nu$ for non-pilot carriers are determined based upon estimates of $\mu$ and $\nu$ for the pilot carriers through a suitable interpolation process.

For two OFDM symbols, let the k and −k frequency bins be used for two pilot carriers. Let $S_r$ represent the FFT output of the received OFDM symbol. For the first OFDM symbol, the magnitude of the k'th frequency bin, |S(k)|, is chosen according to some criteria (e.g., to maximize the signal to noise ratio for S'(k) and the magnitude of the k'th frequency bin), and |S(−k)| is chosen according to another criteria (e.g., to minimize the error in measuring the spectral leakage of S(k) into S'(−k), such as by setting the amplitude and phase of S(−k) to 0). For the second OFDM symbol, the magnitude of the k'th frequency bin, |S(−k)|, is chosen according to some criteria (e.g., to maximize the signal to noise ratio for S'(−k) and the magnitude of the k'th frequency bin), and |S(k)| is chosen according to another criteria (e.g., to minimize the error in measuring the spectral leakage of S(−k) into S'(k), such as by setting the value of S(k) to 0).

Figure 12:
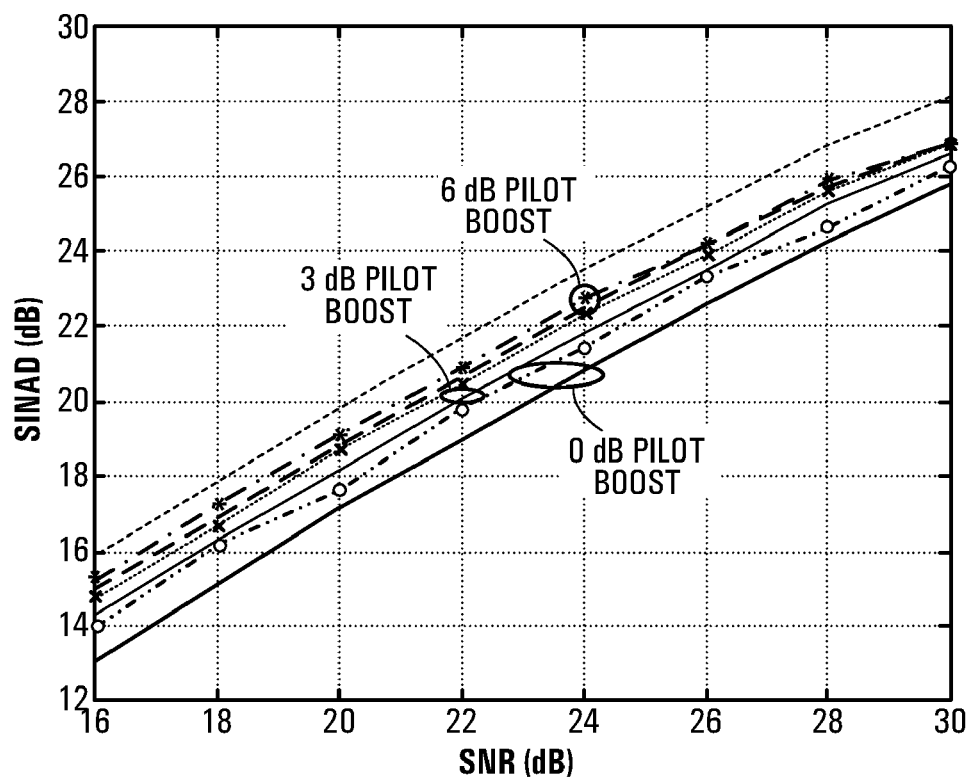
FIG. 12 illustrates a graph showing output signal to noise ratio (SNR) versus signal to noise and distortion (SINAD) for various input SNRs, in accordance with the preferred embodiments of the present invention.
Figure 13:
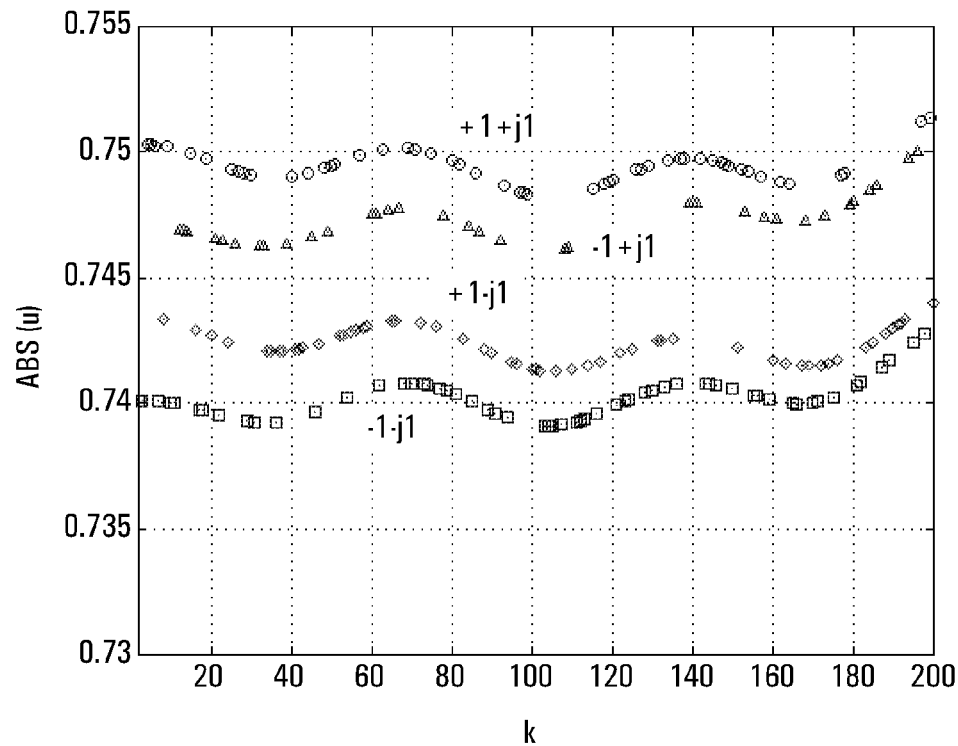
FIG. 13 illustrates a graph showing the absolute value of coefficient $\mu(k)$ plotted over a plurality of positive frequency indices, k, in accordance with the preferred embodiments of the present invention.

FIGS. 11-13 illustrate various graphs showing the results of simulation tests run, in accordance with the preferred embodiments of the present invention. FIG. 11A illustrates a constellation with distortion, FIG. 11C shows a constellation with corrected positive frequencies, FIG. 11D shows a constellation with corrected negative frequencies, and FIG. 11B shows a corrected constellation for both positive and negative frequencies, in accordance with the preferred embodiments of the present invention. FIG. 12 illustrates a graph showing output signal to noise ratio (SNR) versus distortion (SINAD) for various input SNRs, in accordance with the preferred embodiments of the present invention. FIG. 13 illustrates a graph showing the absolute value of coefficient $\mu(k)$ plotted over a plurality of positive frequency indices, k, in accordance with the preferred embodiments of the present invention.

The communication system 100, described in FIGS. 1-10, was simulated using the following characteristics: modulation: 64-QAM (quadrature amplitude modulation), fast Fourier transform (FFT) size is 1024 frequency bins, number of carriers across the bandwidth of the channel is 819, quadrature error between the I and Q components of the signal is 10 degrees, low pass filters are Chebyschev filters with 0.01 dB ripple from 0 to 2.5 MHz and 60 dB attenuation at frequencies greater than 17.5 MHz, amplitude mismatch between the I and Q branches is 6 dB, and phase mismatch between the I and Q branches is 10%. The correction coefficients are based on a linear interpolation of the data symbols over pilot carriers spaced 100 carriers apart.

In FIG. 12, a best set of coefficients was selected from a number of simulation runs using a noiseless communication channel. This best set of coefficients was then used for various input SNRs. For pilot signal boosts of 0 dB, 3 dB and 6 dB two pairs of simulations were run: one where all of the carriers were used for the pilot symbol, the other where every 100th carrier and the DC frequency were used for the pilot symbol and the distortion parameters were interpolated over the sampled pilot carriers. The simulations involving estimated distortion parameters were run over 10 trials per SNR data point. For each trial, 25 OFDM data symbols were simulated to determine the resulting SINAD. The resulting SINADs were averaged together to determine the over all SINAD.

A number of observations evident from the performance graph shown in FIG. 12. Even with the best set of coefficients, there is residual distortion because the output SINAD is less than the input SNR. The limiting value of SINAD for the noiseless channel case was found to be approximately 33 dB. The SINAD obtained using interpolated distortion coefficients is better than that obtained when all of the carriers were used as pilot carriers. There is about a 2 dB penalty in SINAD when no pilot boost is used. For a 6 dB pilot boost there is about a 1 dB penalty in SINAD. The results are obtained with only 2 OFDM symbols which is in stark contrast to the more than 100 iterations used in conventional compensation methods.

During the simulations it was noted that even in the noiseless case there was a variance of a couple of dB in the resulting SINAD. This indicates that the performance is dependent upon the data sequence. Intuitively, this makes sense considering the case where all of the carriers are set to the same data symbol. This creates a sync-like pulse in the time domain where most of the time domain energy is concentrated in a very short burst. To minimize the error in the estimation of the distortion coefficients it is better to spread the signal energy evenly over the symbol duration.

Another observation from the simulation tests was that the distortion coefficients formed four distinct, yet closely spaced, solution spaces determined by the pilot carrier symbol. In FIG. 13, the absolute value of $\mu(k)$ is plotted as a dot over the positive frequency indices, k, from 2 to 200. The absolute value of $\mu(k)$ resulting from data symbol +1+j1 is plotted as a circle, −1+j1 as a triangle, +1−j1 as a diamond and −1−j1 as a square. FIG. 13 shows four distinct sets of curves. A conclusion that can be drawn from this phenomenon is that the pilot symbols should be restricted to +1−j1 and −1+j1 to minimize the SINAD.

Therefore, the simulation tests demonstrate that the distortion coefficients can be effectively estimated with the aid of a pair of pilot symbols over 2 OFDM symbols. These distortion parameters can be used to correct for linear channel distortions, quadrature error, I and Q imbalances and the non-linear phase characteristics of low pass filters. The simulation tests also show that it is possible to interpolate over a relatively small number of pilot carriers to determine the distortion parameters for the remaining data carriers.

Embodiment Employing a De-Coupling of Channel Estimation and IQ Imbalance Compensation This method extends the methods described above to provide a method based on infrequent pilots to evaluate the effect of I/Q imbalance on a received OFDM signal, independently of the fading channel, and to compensate for it in the front-end of the receiver. The corrected OFDM signal then corresponds to that of an ideal receiver (i.e. without I/Q imbalance), and hence allow the use of other pilot-based schemes for channel estimation and/or other purposes. This method allows the use of a simple pilot-based I/Q imbalance compensation scheme in the presence of frequency-selective fast fading channels. Furthermore, it enables the use of low-cost receivers with I/Q imbalance for multiple antenna (MIMO) systems, for which the cost of each Rx path is even more important.

Figure 14:
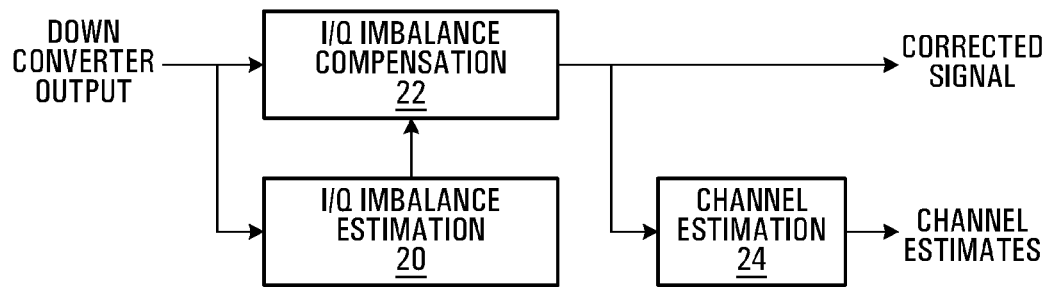
FIG. 14 is a block diagram of a receiver architecture featuring the coupled I/Q imbalance compensation and channel estimation, provided by an embodiment of the invention.

Referring now to FIG. 14, shown is a receiver architecture adapted to perform I/Q imbalance compensation in a manner which is de-coupled from channel estimation. The architecture includes an I/Q imbalance estimation block 20, an I/Q imbalance compensation block 22, and a channel estimation block 24. The output of a down converter block (not shown) is input and parallel to both the I/Q imbalance estimation block 20 and the I/Q imbalance compensation block 22. The I/Q imbalance estimation block determines an I/Q imbalance estimate or estimates, and passes these to I/Q imbalance compensation block 22 where I/Q imbalance compensation is actually implemented. The output of the I/Q imbalance compensation block 22 is an I/Q imbalance compensated signal, also referred to as "corrected signal". This signal is also input to that channel estimation block 24 which performs channel estimation. The output of the channel estimation block 24 is a set of channel estimates. Through proper insertion of the pilot symbols, the I/Q imbalance estimation block 20 can determine I/Q imbalance estimates which are substantially de-coupled from channel estimate. Advantageously, because the rate of change of I/Q imbalance is substantially slower than that of the channel, I/Q imbalance estimation and compensation can be performed at a much slower rate than channel estimation. This also means that pilot symbols inserted for the purpose of I/Q imbalance estimation and compensation (described in detail below) do not need to be inserted nearly as frequently as pilots which are being used for channel estimation. Since fewer pilots are required, better bandwidth utilization results.

It is also noted that in some scenarios there will be no change whatsoever to the I/Q imbalance over time. However, the I/Q imbalance still needs to be determined initially in such circumstances. The architecture of FIG. 14 can be used in any receiver in which the potential for I/Q imbalance exists. Examples include OFDM receivers, receivers of narrowband frequency hop signals, OFDM systems with frequency hopping.

Figure 15:
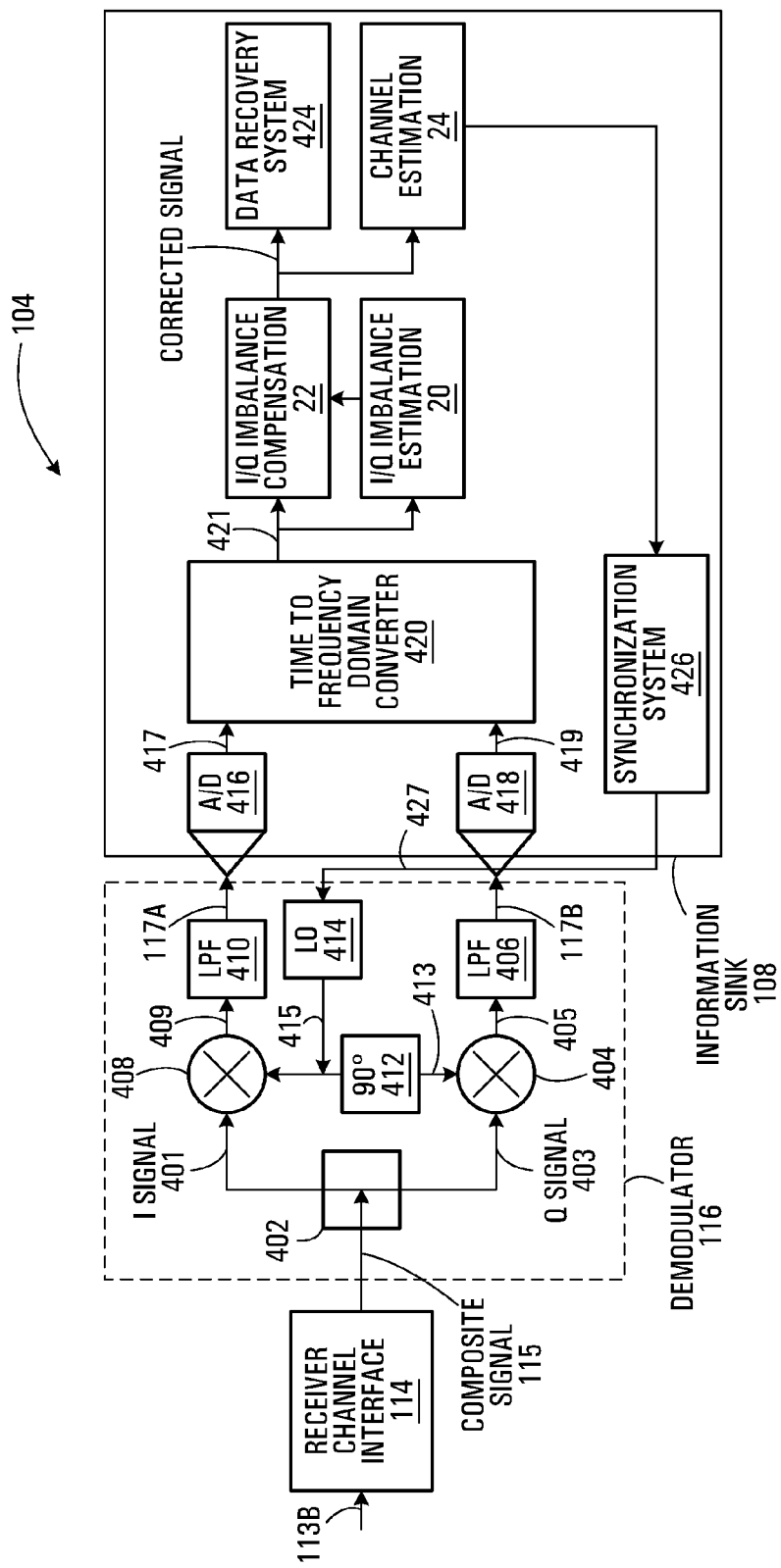
FIG. 15 is a block diagram of the system of FIG. 4 modified to include the receiver architecture of FIG. 14.

Referring now to FIG. 15, shown is a block diagram of a receiver similar to that of FIG. 4, but which is modified to feature the I/Q imbalance estimation and compensation architecture of FIG. 14. Here it can be seen that the output of the time to frequency converter 420 is input to both the I/Q imbalance estimation block 22 and the I/Q imbalance compensation block 20. The channel estimates generated by the channel estimation block 24 are fed back to the synchronization system 426. One difference between this system and that of FIG. 4 is that rather than having outputs of the time to frequency domain converter 420 directly input to the channel estimator 428 of FIG. 4, in FIG. 15 the signal operated on by the channel estimation block 24 is that output by the I/Q imbalance compensation block 22, I/Q imbalance compensation already been performed.

Figure 16:
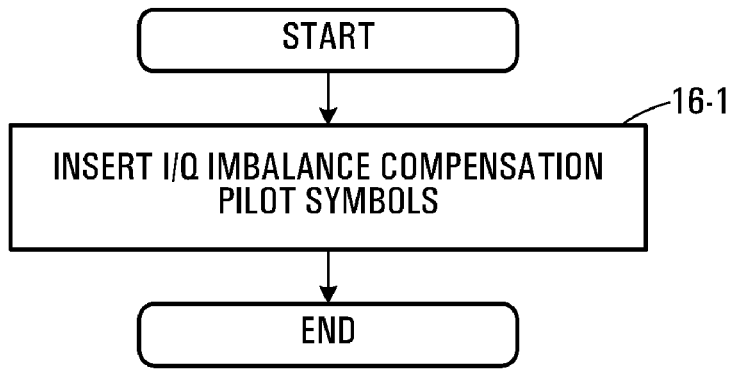
FIG. 16 is a simplified block diagram of I/Q compensation pilot symbol insertion at the transmitter.

FIG. 16 is a very simple block diagram of activities performed at the transmitter to enable this de-coupled I/Q imbalance compensation to take place. At step 16-1, I/Q compensation pilot symbols are inserted into the transmit signal.

Figure 17:
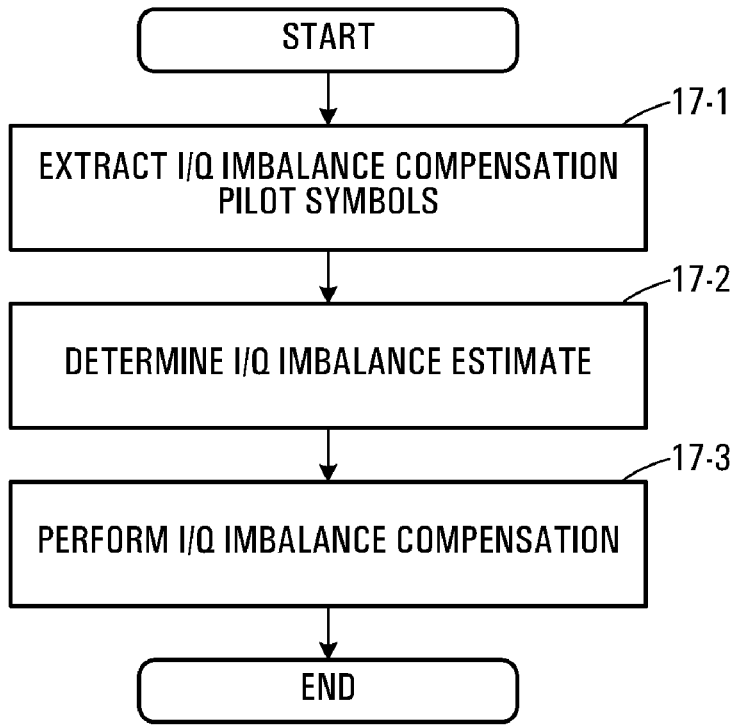
FIG. 17 is a simplified block diagram of I/Q imbalance compensation performed at the receiver.

FIG. 17 shows the steps executed at the receiver to perform I/Q imbalance compensation. To begin, at step 17-1, the I/Q compensation pilot symbols are extracted. At step 17-2, I/Q imbalance estimates are determined. At step 17-3, I/Q imbalance compensation is performed.

Mathematical Basis

A mathematical basis for the de-coupled I/Q imbalance compensation and channel estimation architecture and method will now be presented. This mathematical basis is specific to an OFDM realization.

It is noted that algebraic nomenclature has been reused from the discussion of the previous embodiment.

As demonstrated above, the received signal Y' produced by a direct conversion receiver can be expressed in the frequency domain for an OFDM signal as $$Y'(k) = [\mu(k) \; \nu(-k)] \cdot \begin{bmatrix} Y(k) \\ Y^*(-k) \end{bmatrix}, \quad \text{Equation 1}$$

where k is the frequency sub-carrier index, ranging from $-N_{FFT}/2+1$ to $N_{FFT}/2$, $\mu(k)$ and $\nu(k)$ are the frequency-dependent parameters describing the I/Q imbalance introduced by the direct conversion Rx, and Y is the received signal without distortion. For a perfect Rx without phase and amplitude I/Q imbalance, $\mu(k)=1$ and $\nu(k)=0$. The parameter $\mu(k)$ is equivalent to that of an additional channel, while $\nu(k)$ and $\nu(-k)$ introduce cross-talk between sub-carrier k and $-k$. The impact of $\mu(k)$ can therefore be combined with that of the frequency-selective RF channel, leaving $$Y'(k) = [1 \; \rho(-k)] \cdot \begin{bmatrix} Y(k) \\ Y^*(-k) \end{bmatrix}, \quad \text{Equation 2}$$

where $\rho(k)=\nu(k)/\mu(k)$. In that case, for a single transmitted signal X(k)

$$Y(k)=h(k)X(k)+n(k), \quad \text{Equation 3}$$

where n(k) is AWGN and h(k) is the channel gain, including both the effect of the RF channel and of the distortion parameter $\mu(k)$.

As described above, pilots can be used to evaluate the impact of the I/Q imbalance at the receiver. Let's define two consecutive received symbols as $$Y'_1(k) = [1 \; \rho(-k)] \cdot \begin{bmatrix} Y_1(k) \\ Y_1^*(-k) \end{bmatrix} \quad \text{Equation 4}$$

and $$Y'_2(k) = [1 \; \rho(-k)] \cdot \begin{bmatrix} Y_2(k) \\ Y_2^*(-k) \end{bmatrix}. \quad \text{Equation 5}$$

Equivalently, for index $-k$, we have $$Y'_1(-k) = [1 \; \rho(k)] \cdot \begin{bmatrix} Y_1(-k) \\ Y_1^*(k) \end{bmatrix} \quad \text{Equation 6}$$

and $$Y'_2(-k) = [1 \; \rho(k)] \cdot \begin{bmatrix} Y_2(-k) \\ Y_2^*(k) \end{bmatrix}. \quad \text{Equation 7}$$

If known pilots $R_1(k)$, $R_2(k)$, $R_1(-k)$ and $R_2(-k)$ have been sent by the transmitter, and the effect of the AWGN is neglected, then we have $$\begin{bmatrix} Y'_1(k) \\ Y'_2(k) \end{bmatrix} = \begin{bmatrix} R_1(k) & R_1^*(-k) \\ R_2(k) & R_2^*(-k) \end{bmatrix} \cdot \begin{bmatrix} h(k) \\ h(-k)\rho(-k) \end{bmatrix} \quad \text{Equation 8}$$

and $$\begin{bmatrix} Y'_1(-k) \\ Y'_2(-k) \end{bmatrix} = \begin{bmatrix} R_1(-k) & R_1^*(k) \\ R_2(-k) & R_2^*(k) \end{bmatrix} \cdot \begin{bmatrix} h(-k) \\ h(k)\rho(k) \end{bmatrix}. \quad \text{Equation 9}$$

If the pilot matrix R(k) is defined as $$R(k) = \begin{bmatrix} R_1(k) & R_1^*(-k) \\ R_2(k) & R_2^*(-k) \end{bmatrix}, \quad \text{Equation 10}$$

then this matrix should be defined such as it is not singular, that is $$|R_1(k)R_2^*(-k)-R_2(k)R_1^*(-k)| \neq 0. \quad \text{Equation 11}$$

In that case, R(k) has an inverse and $$\begin{bmatrix} h(k) \\ h(-k)\rho(-k) \end{bmatrix} = R(k)^{-1} \cdot \begin{bmatrix} Y'_1(k) \\ Y'_2(k) \end{bmatrix}, \quad \text{Equation 12}$$

$$\begin{bmatrix} h(-k) \\ h(k)\rho(k) \end{bmatrix} = R(-k)^{-1} \cdot \begin{bmatrix} Y'_1(-k) \\ Y'_2(-k) \end{bmatrix}. \quad \text{Equation 13}$$

Knowing the pilots a priori, it is therefore possible to evaluate h(k), h(-k), $\rho$(k) and $\rho$(-k), using Equation 12 and Equation 13, assuming that the criterion described in Equation 11 is respected.

Using a properly designed pilot pattern, initial estimates for $\rho$(k) and $\rho$(-k) can be obtained first. Once $\rho$(k) and $\rho$(-k) have been evaluated, the received signal can be corrected to remove the effect of the I/Q imbalance in the receiver, using the following equation (from Equation 2)

$$\begin{bmatrix} Y(k) \\ Y^*(-k) \end{bmatrix} = \begin{bmatrix} 1 & \rho(-k) \\ \rho^*(k) & 1 \end{bmatrix}^{-1} \cdot \begin{bmatrix} Y'(k) \\ Y'^*(-k) \end{bmatrix}. \quad \text{Equation 14}$$

The pilots could be designed without respecting the limitation imposed by Equation 11, and be used to track the channel response h(k) using the corrected received signal Y(k).

Since the distortion $\rho$(k) introduced by the direct conversion receiver should not change rapidly over time, it does not need to be tracked as rigorously as the channel. A pilot pattern allowing the estimation of $\rho$(k) can therefore be introduced with a period much larger than the other pilots. Note also that the frequency correlation of $\rho$(k) may be much higher than for h(k). Hence, the frequency and time separation of the pilots used to estimate the distortion could be larger than that used for the channel estimation pilots. Frequency interpolation can be used to evaluate $\rho$(k) for the other sub-carriers. Time-domain interpolation can also be used to improve the accuracy of the estimates. Note also that the impact of poor estimation obtained from pilots suffering from a deep fade (i.e. low SNR) can be minimized by ignoring the pilots that are received with low power.

Figure 18:
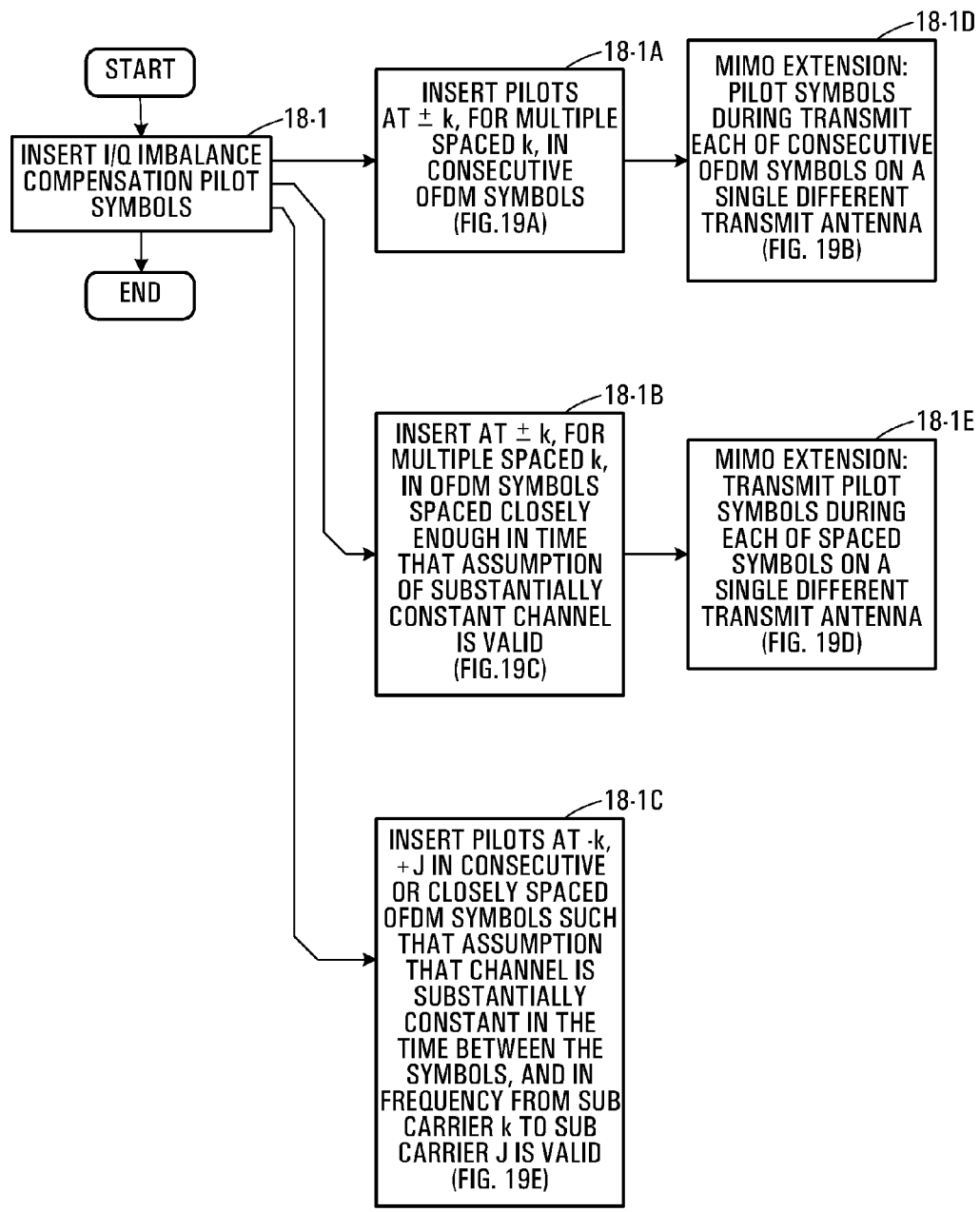
FIG. 18 is a version of the flow chart of FIG. 16 showing a number of different options for I/Q compensation pilot symbol insertion.

The above mathematical details have assumed the particular scenario where in I/Q imbalance compensation pilot symbols are inserted symmetrically at +/−k in consecutive OFDM symbols. The most general implementation of I/Q imbalance compensation pilot symbol insertion is shown in FIG. 18 where at step 18-1, the simple step of inserting I/Q imbalance compensation pilot symbols is shown. FIG. 18 also shows various options for performing pilot symbol insertion. In one option indicated at 18-1A, pilot symbols are inserted at sub-carriers ±k, for multiple spaced k, and in consecutive OFDM symbols. This is basically the example for which mathematical details have been provided above.

Figure 19A:
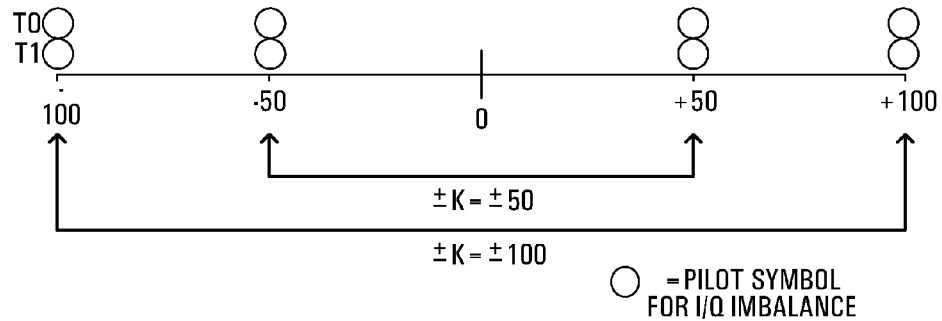
FIGS. 19A through 19E provide example locations for I/Q imbalance pilot symbol insertion.

Referring to FIG. 19A, shown is an illustrative example of pilot symbol insertion for this case. In this case, pilot symbols are shown inserted at ±k=±50, and ±k=±100. The pilot symbols are shown inserted at times T0 and T1 which represent consecutive OFDM symbols. For sub-carriers other than ±50 and ±100, other transmission signals would be present, but these are not shown in the interest of simplicity. The pilot symbol insertion method of FIG. 18-1A, as exemplified in FIG. 19A, is appropriate in most circumstances, since in order for a valid I/Q estimate to be obtained, the assumption that must be made is that the channel estimate will be relatively constant between adjacent OFDM symbols and that the I/Q imbalance estimate ρ(k) is also constant over these two symbols.

Figure 19B:
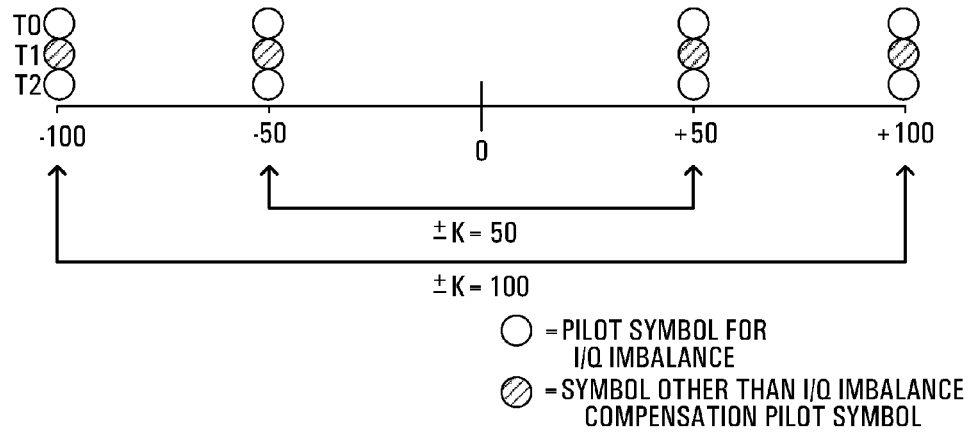

Another example of pilot symbol insertion is shown in FIG. 18 again, at step 18-1B. In this case, pilot symbols are again inserted at ±k, for multiple spaced k, but rather than inserting these in consecutive OFDM symbols, they are spaced in OFDM symbols that are spaced closely enough in time that the assumption of a substantially constant channel is still valid. An example of this is shown in FIG. 19B where pilot symbols similar to those of FIG. 19A have been inserted at times T0 and T2, but at time T1 which represents an intervening OFDM symbol, symbols other than the I/Q imbalance compensation pilot symbols are inserted.

Figure 19C:
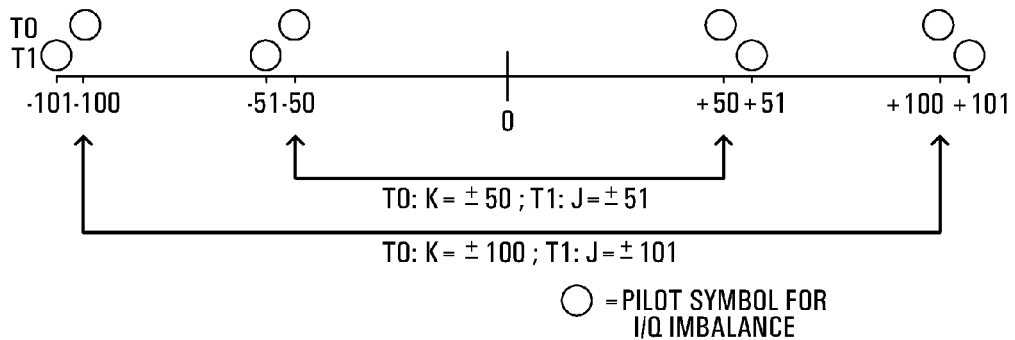

In another example, shown at 18-1C, pilots are inserted at −k, +k, and at −j, +j in consecutive or closely spaced in time OFDM symbols such that the assumption that the channel is substantially constant in time between these symbols and in frequency from sub-carrier k to sub-carrier j is valid. In other words, there is some flexibility to use frequencies with a small offset d (k+d and −k−d) to send the second set of pilots (R2), as long as h(k)~h(k+d) and h(−k)~h(−k−d). An example of this is shown in FIG. 19C where pilot symbols are shown inserted for T0 at −k=−50, k=50, and ±100, and at T1 for j=±51, ±101. In this example the pilot symbols are inserted for consecutive OFDM symbols.

In any of the above examples, the pilot symbols are inserted in consecutive or spaced OFDM symbols, but only as often as required in order to update the I/Q imbalance compensation estimates. As indicated previously, these estimates can almost be considered to be constant for a given receiver/transmitter combination. As such, in the extreme case, they only really need to be determined once when a receiver is initially turned on. In some embodiments, the frequency of insertion of I/Q imbalance compensation pilot symbols is dictated by access channel issues. Since the receiver must recover the I/Q imbalance compensation symbols in order to perform channel estimation and set up a channel when the mobile station is initially turned on, if the frequency of I/Q imbalance compensation pilot symbols is too low, then it may take longer than would be desirable for access by the mobile station to occur. In yet another example, the I/Q imbalance compensation pilots can all be sent in a single OFDM symbol by using different frequencies to fill the function of different times in the previous examples. For example, a first set could be at k=±50, ±100, and a second set in the same OFDM symbol at ±51, ±101.

Extension to MIMO Channels

The above-described I/Q imbalance compensation systems and methods are extendable to apply to multiple antenna (MIMO) systems. Assuming that a different direct conversion receiver is used for each of the $N_R$ Rx antennas, the signal received at antenna i can be expressed as $$Y'_i(k) = [1 \; \rho_i(-k)] \cdot \begin{bmatrix} Y_i(k) \\ Y_i^*(-k) \end{bmatrix}. \qquad \text{Equation 15}$$

If the symbols used to evaluate $\rho_i(k)$ for each antenna is such that only Tx antenna 1 is transmitting at sub-carrier k and −k, then $$\begin{bmatrix} h_{li}(k) \\ h_{li}(-k)\rho_i(-k) \end{bmatrix} = R(k)^{-1} \cdot \begin{bmatrix} Y'_i(k) \\ Y'_i(k) \end{bmatrix}, \qquad \text{Equation 16}$$

and $$\begin{bmatrix} h_{li}(-k) \\ h_{li}(k)\rho_i(k) \end{bmatrix} = R(-k)^{-1} \cdot \begin{bmatrix} Y'_i(-k) \\ Y'_i(-k) \end{bmatrix}. \qquad \text{Equation 17}$$

Using proper pilot patterns, it is then possible to evaluate $\rho_i(k)$ and $\rho_i(-k)$.

Figure 20:
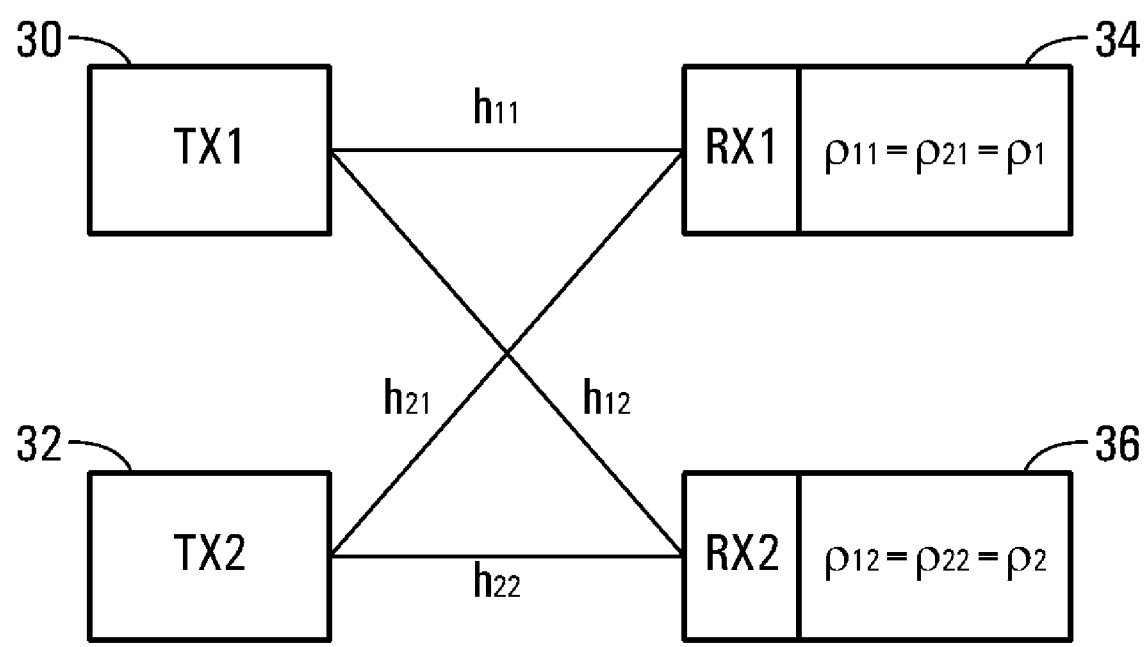
FIG. 20 is a simple illustration of a MIMO system.

Referring now to FIG. 20, an example of the above-discussed MIMO system is shown. In this example, to transmit systems TX1 30 and TX2 32 are shown. Also shown are two receive systems RX1 34 and RX2 36. The channel from TX1 30 to RX1 34 is represented by $h_{11}$ the channel from TX1 30 to RX2 36 is indicated by $h_{12}$. The channel from TX2 32 to RX1 34 is indicated by $h_{21}$. Finally, the channel from TX2 32 to RX2 36 is indicated by $h_{22}$. At the receiver RX1 34, the assumption is that the I/Q imbalance which occurs on the channel $h_{11}$ is $\rho_{11}$, and the I/Q imbalance occurring on channel $h_{21}$ is given by $\rho_{21}$. The assumption here is made that the I/Q imbalance is only a function of the receiver and as such the assumption that $\rho_{11}=\rho_{21}=\rho_1$ can be made. This assumption is valid because most of the I/Q imbalance occurs because of hardware in the receiver that performs the direct down conversion.

Similarly, in the other receiver $\rho_{12}$, $\rho_{22}$ can be defined and the assumption that $\rho_{12}=\rho_{22}=\rho_2$ can be made.

It is noted that I/Q imbalance estimates could be obtained by only inserting pilot symbols in one transmit antenna output. In either case, the activities performed at the receiver to determine I/Q imbalance estimates are identical to those described above for the single input single output case.

Figure 19D:
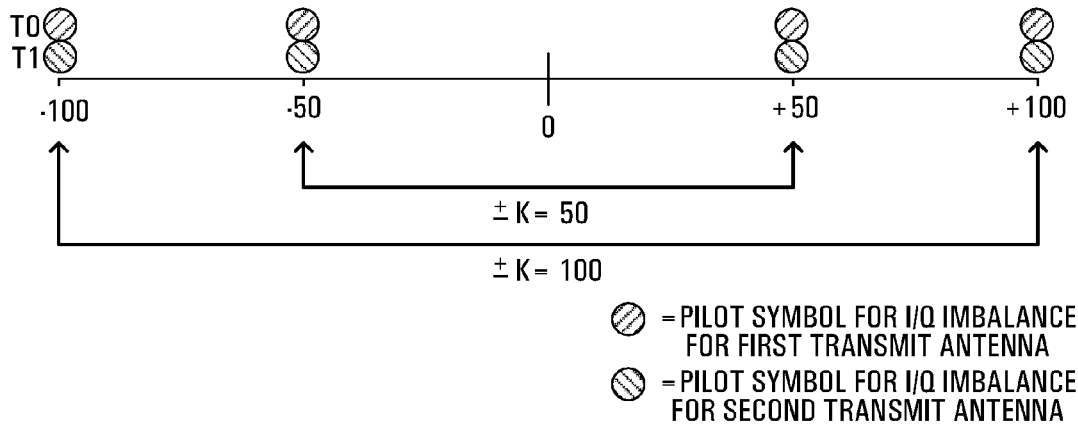

In a first example implementation shown at FIG. 18, and more specifically 18-1D, for the MIMO extension, pilot symbols are transmitted during each of at least two consecutive OFDM symbols, and for each OFDM symbol the pilot symbols are inserted on a different transmit antenna. An example of this is shown in FIG. 19D where OFDM symbol T0, pilot symbols are inserted for the first transmit antenna at k=±50 and k=±100. For the second OFDM symbol, the pilot symbols are inserted for the second transmit antenna in the same sub-carrier locations.

Figure 19E:
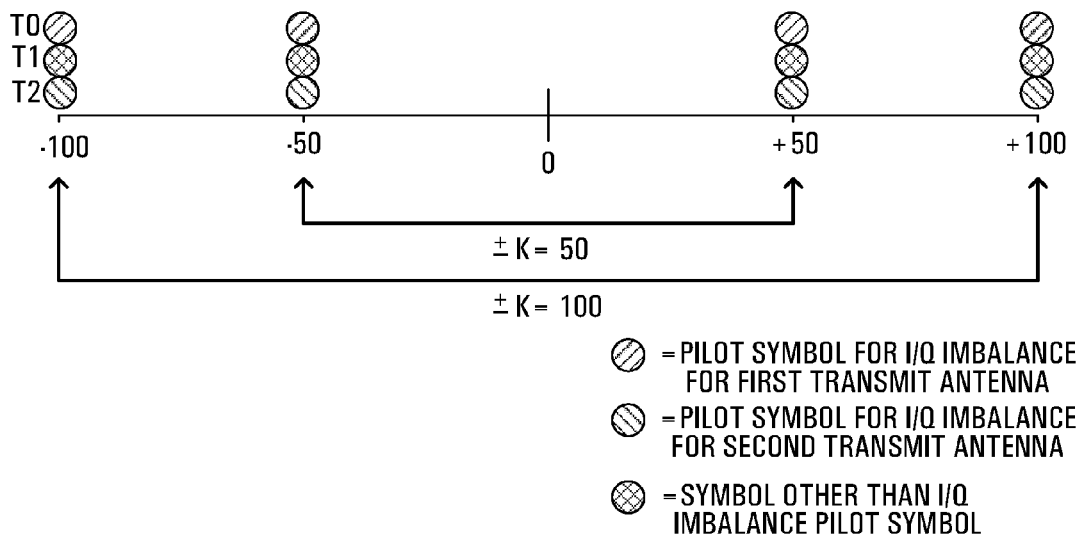

The same generalizations can be applied to the MIMO embodiment as were discussed earlier for the single input single output example. For example, as shown 18-1E, the pilot symbols might be inserted during each of spaced symbols on a respective different transmit antenna. For example, as shown in FIG. 19E, pilot symbols are inserted by the first transmit antenna during OFDM symbol T0, non-pilot transmissions occur during time T1, and pilot symbols are inserted by the second transmit antenna at OFDM symbol T2.

Furthermore, if assumptions that the channel is substantially constant for some amount of frequency deviation, it would not be necessary to have the pilots inserted at precisely ±k, but instead they could be inserted at ±k, for one OFDM symbol and ±j for the another OFDM symbol as was the case in the example of 18-1C and FIG. 19C for the single input single output case.

Specific figures have been described having showing functional blocks. Each of these functional blocks can be implemented as a respective circuit, for example, an FPGA, DSP, ASIC, general purpose processor, or otherwise. In some implementations it may be appropriate to combine any or all of the functional blocks into a single such circuit. In other embodiments, the apparatus can be realized as a computer readable medium containing executable code in combination with a processor or computer on which the code can be executed either on its own, or in combination with one or more application specific or general purpose circuits.

Hence, while the present invention has been described with reference to various illustrative embodiments thereof, the present invention is not intended that the invention be limited to these specific embodiments. Those skilled in the art will recognize that variations, modifications and combinations of the disclosed subject matter can be made without departing from the spirit and scope of the invention as set forth in the appended claims.

The invention claimed is:

1. A method for use in a receiving apparatus for receiving comprising:
    the receiving apparatus receiving a first receive signal, including a first pilot symbol, at a first receive time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel;
    the receiving apparatus determining a first value of the first pilot carrier, located at the first predetermined sample frequency, responsive to receiving the first receive signal;
    the receiving apparatus determining a second value of the second pilot carrier, located at the second predetermined sample frequency, responsive to receiving the first receive signal;
    the receiving apparatus receiving a second receive signal, including a second pilot symbol, at a second receive time that is different from the first receive time, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel;
    the receiving apparatus determining a third value of the third pilot carrier, located at the third predetermined sample frequency, responsive to receiving the second receive signal;
    the receiving apparatus determining a fourth value of the fourth pilot carrier, located at the fourth predetermined sample frequency, responsive to receiving the second receive signal;
    the receiving apparatus generating a distortion estimate for each of the first, second, third and fourth predetermined sample frequencies, based on the first, second, third and fourth values, respectively.

2. The method according to claim 1 further comprising:
    the receiving apparatus receiving the first receive signal at the first receive time and receiving the second receive signal at the second receive time, wherein the first receive time and the second receive time are spaced apart in time.

3. The method according to claim 1, wherein the first predetermined sample frequency and the second predetermined sample frequency correspond to a predetermined positive frequency and a predetermined negative frequency, respectively, and the third predetermined sample frequency and the fourth predetermined sample frequency correspond to a predetermined positive frequency and a predetermined negative frequency, respectively, the third predetermined sample frequency and the fourth predetermined sample frequency being different than the first predetermined sample frequency and the second predetermined sample frequency, respectively.

4. The method according to claim 3, wherein the respective predetermined positive frequencies and negative frequencies are symmetrical about a direct current (DC) frequency in the bandwidth of the communication channel and wherein the pilot carriers of the first pilot symbol are located at carrier locations +/−k for multiple spaced k, where k is an integer value, and the pilot carriers of the second pilot symbol are located at carrier locations +/−j for multiple spaced j, where j is an integer value.

5. The method according to claim 1 further comprising:
    the receiving apparatus performing the method in an analogous manner for each of a plurality of receive paths in a multi-antenna receiver to generate distortion estimates for each receive path.

6. The method of claim 1 further comprising:
    performing distortion compensation of the first and second received signals using said respective distortion estimates to generate a corrected signal.

7. A receiving apparatus comprising:
    receive circuitry configured to receive a first receive signal, including a first pilot symbol, at a first receive time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel;
    a distortion estimator configured to:
        determine a first value of the first pilot carrier, located at the first predetermined sample frequency, responsive to receiving the first receive signal; and
        determine a second value of the second pilot carrier, located at the second predetermined sample frequency, responsive to receiving the first receive signal;
    the receive circuitry being further configured to receive a second receive signal, including a second pilot symbol, at a second receive time that is different from the first receive time, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel;

wherein the distortion estimator further:
  determines a third value of the third pilot carrier, located at the third predetermined sample frequency, responsive to receiving the second receive signal;
  determines a fourth value of the fourth pilot carrier, located at the fourth predetermined sample frequency, responsive to receiving the second receive signal; and
  generates a respective distortion estimate for each of the first, second, third and fourth predetermined sample frequencies based on the first, second, third and fourth values, respectively.

8. The apparatus of claim 7 further comprising a distortion compensator configured to perform distortion compensation of the first and second received signals using said respective distortion estimates to generate a corrected signal.

9. The apparatus of claim 7 comprising a plurality of receive antennas each having an associated receive path, and the distortion estimator configured to generate distortion estimates for each receive path.

10. The apparatus of claim 7 wherein the first predetermined sample frequency and the second predetermined sample frequency correspond to a predetermined positive frequency and a predetermined negative frequency, respectively, and the third predetermined sample frequency and the fourth predetermined sample frequency correspond to a predetermined positive frequency and a predetermined negative frequency, respectively, the third predetermined sample frequency and the fourth predetermined sample frequency being different than the first predetermined sample frequency and the second predetermined sample frequency, respectively.

11. The apparatus of claim 7 wherein the respective predetermined positive frequencies and negative frequencies are symmetrical about a direct current (DC) frequency in the bandwidth of the communication channel and wherein the pilot carriers of the first pilot symbol are located at carrier locations +/−k for multiple spaced k, where k is an integer value, and the pilot carriers of the second pilot symbol are located at carrier locations +/−j for multiple spaced j, where j is an integer value.

12. A mobile terminal comprising:
  at least one antenna;
  receive circuitry electrically connected to at least one of the at least one antenna configured to receive a first receive signal, including a first pilot symbol, at a first receive time, wherein the first pilot symbol is represented by a first pilot carrier, having a first predetermined value, and a second pilot carrier, having a different, second predetermined value, located at a first predetermined sample frequency and a second predetermined sample frequency, respectively, in a bandwidth of a communication channel;
  a distortion estimator configured to:
    determine a first value of the first pilot carrier, located at the first predetermined sample frequency, responsive to receiving the first receive signal; and
    determine a second value of the second pilot carrier, located at the second predetermined sample frequency, responsive to receiving the first receive signal;
  the receive circuitry being further configured to receive a second receive signal, including a second pilot symbol, at a second receive time that is different from the first receive time, wherein the second pilot symbol is represented by a third pilot carrier, having a third predetermined value, and a fourth pilot carrier, having a fourth predetermined value, which is different than the third predetermined value, located at a third predetermined sample frequency and a fourth predetermined sample frequency, respectively, in the bandwidth of the communication channel;
  wherein the distortion estimator further:
    determines a third value of the third pilot carrier, located at the third predetermined sample frequency, responsive to receiving the second receive signal;
    determines a fourth value of the fourth pilot carrier, located at the fourth predetermined sample frequency, responsive to receiving the second receive signal; and
    generates a respective distortion estimate for each of the first, second, third and fourth predetermined sample frequencies based on the first, second, third and fourth values, respectively.

13. The mobile terminal of claim 12 further comprising a distortion compensator configured to perform distortion compensation of the first and second received signals using said respective distortion estimates to generate a corrected signal.

14. The mobile terminal of claim 12 wherein the at least one antenna is a plurality of receive antennas each having an associated receive path, and the distortion estimator is configured to generate distortion estimates for each receive path.

15. The mobile terminal of claim 12 wherein the first predetermined sample frequency and the second predetermined sample frequency correspond to a predetermined positive frequency and a predetermined negative frequency, respectively, and the third predetermined sample frequency and the fourth predetermined sample frequency correspond to a predetermined positive frequency and a predetermined negative frequency, respectively, the third predetermined sample frequency and the fourth predetermined sample frequency being different than the first predetermined sample frequency and the second predetermined sample frequency, respectively.

16. The mobile terminal of claim 12 wherein the respective predetermined positive frequencies and negative frequencies are symmetrical about a direct current (DC) frequency in the bandwidth of the communication channel and wherein the pilot carriers of the first pilot symbol are located at carrier locations +/−k for multiple spaced k, where k is an integer value, and the pilot carriers of the second pilot symbol are located at carrier locations +/−j for multiple spaced j, where j is an integer value.

* * * * *